(12) United States Patent
Sander et al.

(10) Patent No.: US 8,781,472 B2
(45) Date of Patent: Jul. 15, 2014

(54) METHOD AND ARRANGEMENT IN A COMMUNICATION NETWORK

(75) Inventors: Ann-Christine Sander, Västa Frölunda (SE); Thomas Lindqvist, Mölndal (SE); Arne Norefors, Stockholm (SE); Tomas Nylander, Värmdö (SE); Johan Rune, Lidingö (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 309 days.

(21) Appl. No.: 13/145,723

(22) PCT Filed: Apr. 7, 2009

(86) PCT No.: PCT/SE2009/050362
§ 371 (c)(1),
(2), (4) Date: Jul. 21, 2011

(87) PCT Pub. No.: WO2010/085191
PCT Pub. Date: Jul. 29, 2010

(65) Prior Publication Data
US 2011/0281584 A1    Nov. 17, 2011

Related U.S. Application Data

(60) Provisional application No. 61/146,811, filed on Jan. 23, 2009.

(51) Int. Cl.
*H04W 36/00* (2009.01)
(52) U.S. Cl.
USPC .......................... 455/436; 455/438; 455/439
(58) Field of Classification Search
USPC ........ 455/422.1, 436–444; 370/328, 331–333
See application file for complete search history.

(56) References Cited

U.S. PATENT DOCUMENTS

2007/0183427 A1    8/2007    Nylander et al.
2008/0267153 A1    10/2008    Mukherjee et al.
(Continued)

FOREIGN PATENT DOCUMENTS

| JP | 2009510969 A | 3/2009 |
|---|---|---|
| WO | 2007040449 A1 | 4/2007 |
| WO | 2010075473 A2 | 7/2010 |

OTHER PUBLICATIONS

3rd Generation Partnership Project. "Idle State Access Restriction for Home eNB." 3GPP TSG-RAN Wg2#59, Tdoc R2-073415, Athens, Greece, Aug. 20-24, 2007.

(Continued)

*Primary Examiner* — Ajit Patel
(74) *Attorney, Agent, or Firm* — Coats & Bennett, PLLC

(57) ABSTRACT

Method and arrangement in a network control node, for performing access control of a mobile node in a handover from a source cell to a target subscriber group cell. The method comprises obtaining a network based allowed subscriber group list, receiving a target subscriber group identification, checking if the target subscriber group identification is comprised in the obtained network based allowed subscriber group list. If it is, information from a target network control node is obtained, verifying that the received subscriber group identification corresponds to the target subscriber group cell. Still further, the method comprises granting the mobile node access to the target subscriber group cell. Also, a method and arrangement in a target network control node, for assisting a network control node in performing access control for a mobile node in a handover from a source cell to a target subscriber group cell is provided.

16 Claims, 9 Drawing Sheets

(56) References Cited

U.S. PATENT DOCUMENTS

2010/0069062 A1* 3/2010 Horn et al. ............... 455/434
2010/0161794 A1* 6/2010 Horn et al. ............... 709/224
2011/0268034 A1 11/2011 Cho et al.
2011/0269468 A1 11/2011 Sundell et al.
2012/0083273 A1 4/2012 Mukherjee et al.

OTHER PUBLICATIONS

3rd Generation Partnership Project. "Discussion on Inbound Mobility from 3G Marco Cell to HNB." 3GPP TSG-RAN WG3 Meeting#63bis, R3-090802, Seoul, Korea, Mar. 23-26, 2008.

3rd Generation Partnership Project. "Disucsson of Inbound Handove" 3GPP TSG-RAN Wg3#63bis, R3-090804, Seoul, Korea, Mar. 23-26, 2009.

3rd Generation Partnership Project, "Technical Specification Group Services and System Aspects; General Packet Radio Service (GPRS) enhancements for Evolved Universal Terrestrial Radio Access Network (E-UTRAN) access (Release 8)", Dec. 2008, 3GPP TS 23.401 V8.4.1.

Panasonic, "UE access control in CSG cell", 3GPP TSG RAN WG2 #62, May 5-9, 2008, pp. 1-5, Kansas City, US, R2-082238.

Huawei, "Access Control Requirements in Rel-9", 3GPP TSG SA WG2 Meeting #70, Jan. 12-16, 2009, pp. 1-3, Scottsdale, Phoenix, US, S2-90207.

Qualcomm Europe, "Access control for in-bound mobility to HeNBs", 3GPP TSG SA WG2 Meeting #70, Jan. 12-16, 2009, pp. 1-4, Scottsdale, Phoenix, US, S2-090129.

* cited by examiner

METHOD AND ARRANGEMENT IN A COMMUNICATION NETWORK

TECHNICAL FIELD

The present invention relates to a method and arrangement in a network control node and to a method and arrangement in a target control node. In particular, it relates to a mechanism for improving the access control of a mobile node in a handover from a source cell, into a target cell.

BACKGROUND

In 3G Universal Mobile Telecommunications Systems (UMTS) and in particular in its evolved version System Architecture Evolution/Long Term Evolution (SAE/LTE), also referred to as Evolved Packet Core/Evolved Universal Terrestrial Radio Access Network (EPC/E-UTRAN), and also Evolved Packet System (EPS) although EPS also comprises the combinations EPC/UTRAN and EPC/GERAN, the concept of home base stations is introduced. GERAN is an abbreviation for GSM EDGE Radio Access Network, wherein GSM in turn is an abbreviation for Global System for Mobile communications and EDGE is an abbreviation for Enhanced Data rates for GSM Evolution. In 3G radio access (UTRAN) a home base station is referred to as a Home Node B (HNB) whereas in EPC/E-UTRAN it is referred to as a Home eNodeB (HeNB). A cell served by a HNB or a HeNB is commonly referred to as a femtocell. A home base station is assumed to be placed in a private home, utilizing the home owner's fixed broadband connection to access the core network. Other possible deployments are in a campus, shopping mall, company etc. It is also assumed that the home owner handles the actual physical installation of the home base station. Hence, the deployment of home base stations cannot be planned, since it is largely outside the control of the operator. Another important property of the home base station concept is the potentially large number of home base stations.

A HeNB/HNB provides normal service for the end users and is connected to the mobile core network using Internet Protocol (IP) based transmission, typically the HeNB/HNB owner's broadband access and the Internet. The radio coverage provided may be referred to as a femtocell. In a typical example deployment scenario, a femtocell covers the HeNB/HNB owner's home.

One of the main drivers of this concept of providing local access is to provide cheaper call or transaction rates/charges when connected via the HeNB/HNB than when connected via a eNodeB, i.e. an E-UTRAN base station; or a NodeB i.e. a UTRAN 3G WCDMA/HSPA base station. Another driver is reducing the load on the operator's eNodeBs/NodeBs and backhaul connections, thereby reducing the operator's Capital Expenditures (CAPEX) and Operational Expenditures (OPEX).

The term Home Node (HN) is here used as a common name for a 3G/UTRAN Home NodeB or an EPC/E-UTRAN Home eNodeB. A HN may connect to the operator's network via a secure tunnel, supposedly IPsec protected, to a security gateway at the border of the operator's network. Via this tunnel, said HN node connects to the core network nodes of the operator's core network, such as e.g. Mobility Management Entity (MME) and Serving Gateway (S-GW) via the S1 interface or Serving General Packet Radio Service (GPRS) Support Node (SGSN) and Mobile Switching Centre (MSC), or Media Gateway (MGW) and MSC server via the Iu interface. Iu is the interface between the radio access network and the core network in 3G UMTS, i.e. between Radio Network Controller (RNC), or a HNB via a HNB Gateway, and SGSN/MSC/MSC server/MGW, depending on the access technology used.

The 3rd Generation Partnership Project (3GPP) operator may also deploy a concentrator node in its network between the 3G/UTRAN Home NodeBs or, EPC/E-UTRAN Home eNodeBs and the regular core network nodes. In the EPC/E-UTRAN standardization such a concentrator node is commonly referred to as a HeNB Gateway, which may be an optional node in HeNB solutions. The corresponding node name in 3G UMTS standardization is HNB Gateway and this node is mandatory in 3G HNB systems.

A possible Network Address Translation/Translator (NAT) between the HN and the 3GPP network is not a problem for the IPsec tunnel, because Internet Key Exchange version 2 (IKEv2), which can handle NAT traversal, i.e. activate User Datagram Protocol (UDP) encapsulation for Encapsulating Security Payload (ESP) traffic as needed, is assumed to be used for the IPsec tunnel establishment. Internet Protocol Security (IPsec) is a suite of protocols for securing IP communications by authenticating and encrypting each IP packet of a data stream. IKEv2 and/or IPsec also comprise protocols for establishing mutual authentication between agents at the beginning of the session and negotiation of cryptographic keys to be used during the session. In the following descriptions and drawings, entities related to security, e.g. Security GateWay (SEGW) has been left out.

Through this setup a mobile node, which also may be referred to as e.g. a User Equipment (UE), communicates via the HN and the core network like any other mobile node.

When a HN is installed, the Operation and Maintenance (O&M) system directs the HN to connect to a suitable core network node or pool of core network nodes, via a concentrator node, i.e. a HeNB connects to an MME pool, probably via a HeNB Gateway, and a HNB connects to an SGSN and possibly an MSC or MSC server, or pools of such nodes, via a HNB Gateway. The suitable core network node or pool of core network nodes that the O&M system selects is the core network node, or pool of core network nodes which serves the macro layer base stations whose cells cover the location where the HN is located. The purpose of this choice of core network node, or pool of core network nodes is to as far as possible avoid inter-core network node handovers, e.g. inter MME pool handover or inter-SGSN/pool handover, when the mobile node is handed over between a macro layer base station and the HN or vice versa. The same principle applies also for idle mode mobility i.e. when a mobile node moves in idle mode between a macro layer base station and the HN or vice versa. In this case it may be beneficial to avoid inter-core network node registration area updates, i.e. Tracking Area Updates in EPC/E-UTRAN and Location Updates and Routing Area Updates in 3G to avoid the need to perform inter-core network node signalling and to avoid updating the mobile station's new location in the Home Location Register (HLR) and/or Home Subscriber Server (HSS).

The HN concept is closely related to the concept of subscriber groups such as e.g. Closed Subscriber Group (CSG). A femtocell may also be assumed to be a subscriber group cell such as e.g. a CSG cell. This means that only a selected group of subscribers are allowed to access the network through that cell. In the system information broadcast in a CSG cell a Boolean type CSG indication is included to inform mobile stations that the cell is a CSG cell. In addition, the subscriber group e.g. CSG of a subscriber group cell e.g. CSG cell is identified by a subscriber group identifier e.g. CSG ID, which may also be broadcasted in the cell as a part of the system information. Typically each subscriber group cell, e.g. CSG cell, has its own unique subscriber group identifier, such as e.g. CSG ID, but it may also be possible to define the same subscriber group identifier e.g. CSG ID for multiple cells, thereby forming a subscriber group zone, in which the same selected group of subscribers is allowed access. However, a subscriber group cell e.g. a CSG cell does not, in principle, have to be a femtocell, but may be also any other type of cell.

Hence, all subscribers are not allowed to access a certain HN and a certain subscriber is not allowed to access all HNs. Under supervision of the operator the owner of a HN defines which subscribers are allowed to access a femtocell and/or CSG cell of the HN, i.e. which subscribers that are included in the CSG of the femtocell. The created data is herein referred to as "CSG data", "CSG definition" or possibly "HN access list", which is an equivalent term assuming that the HN only serves one CSG, which may typically be the case. This is assumedly done through a web interface, or other "interface" between the HN owner and the operator's administrative systems, and the CSG data is stored in a database in the operator's network, which may be regarded as a part of the operator's Operation, Maintenance, Administration & Provisioning (OMA&P) system. Note that the entities interacting with the HN owner for this purpose may be entities devoted to subscriber administration/provisioning or entities devoted to O&M tasks and in this document also such entities are, for simplicity, grouped into what is known as the OMA&P system. A subscriber may be included in a CSG indefinitely, i.e. until explicitly removed, or on a time limited basis, often referred to as a "guest". Although the exact mechanism and format are not specified in 3GPP yet, the HN owner may be assumed to enter the allowed subscribers in the form of Integrated Services Digital Network numbers (ISDN numbers), e.g. Mobile Subscriber ISDN number (MSISDN number), or International Mobile Subscriber Identities (IMSI).

The CSG data, or HN access list, is reflected in the so-called Allowed CSG Lists (ACL), also known as CSG Whitelists, associated with the concerned mobile nodes. Each mobile node has an Allowed CSG List, which includes the CSG ID of each CSG the mobile node, or more precisely the subscriber using the mobile node is included in, i.e. the CSG ID of each femtocell the mobile node or actually the subscriber is allowed to access. A CSG is actually associated with a group of subscribers rather than mobile nodes, but for simplicity the term mobile node may be used as the entity of which a CSG is formed. Similarly, a CSG Whitelist may actually be associated with a subscriber rather than with a mobile node, but for simplicity the mobile node in this context may be used as a "proxy" for the subscriber using it, such that a CSG Whitelist may be referred to as belonging to the mobile node and the mobile node may be said to be allowed or not allowed access to a CSG cell.

The ACL of a subscriber may be stored in a database e.g. the HSS of the subscriber's home network together with other subscriber data, but another database than the HSS may eventually be chosen for this task. The data is transferred from the OMA&P system, where the CSG data resides, to the HSS, where it is distributed to appropriate subscriber records. This applies to both creation and updates, i.e. additions or exclusions of subscribers of the CSG data. It is also possible for the OMA&P system to maintain its own copies of the ACLs or to assemble them from the CSG data when needed. The ACL of a subscriber may also be stored in the mobile node of the subscriber, e.g. in the Universal Subscriber Identity Module (USIM) so that the mobile node itself may determine whether it is allowed to access a certain CSG cell or not, in order to avoid useless access attempts. The ACL may be transferred from the network to the mobile node for example via Open Mobile Alliance Device Management (OMA DM), or Over-The-Air (OTA) USIM configuration technology, or Short Message Service (SMS) or implicitly via NAS signalling. Furthermore, in EPS/LTE the ACL of a mobile node may be downloaded from the HSS to the MME serving the mobile node, assumedly together with other subscriber data which is relevant for the serving MME, so that the MME may perform CSG based access control of mobile nodes requesting network access via a CSG cell, e.g. an Attach Request, a Tracking Area Update (TAU) Request or a Service Request. This mechanism is likely to be similar in 3G, utilizing a node corresponding to the MME, i.e. the SGSN and/or the MSC server, performing CSG based access control on the corresponding 3G procedures.

The search for allowed CSG cells is not governed by the network, but is left to the mobile node to handle autonomously. To identify an allowed CSG cell the mobile node must read the CSG ID from the system information broadcast in the cell and compare it with the CSG ID/s stored in ACL. When a match is found, the mobile node has discovered an allowed CSG cell.

During handover into a CSG cell the source (H)eNodeB, or source Radio Network Subsystem (RNS) or source HNB in 3G or source Base Station Subsystem (BSS) in 2G rely to a greater extent on the mobile node than during other handovers, because the neighbour relations are not maintained towards CSG cells in the same way as towards regular macrocells. Hence it is up to the mobile node to detect and report the presence of a CSG cell which may be a suitable target cell for handover. In addition, all handovers into a CSG cell are signalled via the core network e.g. S1 handover in EPC/E-UTRAN.

When a mobile node is handed over to a CSG cell, CSG based access control has to be performed, just as when a mobile node performs TAU, LAU or RAU or sends a service request in a CSG cell.

Currently, the only CSG based access control defined in the network, i.e. excluding the mobile node's own filtering of allowed and not allowed CSG cells, based on its internal ACL is the access control the serving MME or SGSN or MSC/MSC server performs when a mobile node accesses a CSG cell, e.g. Attach Request, Tracking Area Update (TAU)/Location Area Update (LAU)/Routing Area Update (RAU) Request or Service Request.

There is no CSG based access control mechanism designed/specified specifically for handover into a CSG cell. Moreover, applying the regular CSG based access control in the handover into CSG cell case has significant disadvantages.

First, in conjunction with handover into a CSG cell the regular CSG based access control will not be triggered until the mobile node performs a location registration, i.e. TAU in EPC/E-UTRAN, RAU/LAU in 3G, after the handover is concluded. This means that resources are allocated in the target CSG cell, resources are released in the source cell and the mobile node is already communicating in the target CSG cell when the access control is to be performed.

Second, a location registration e.g. TAU may not be triggered in all cases. If the handover is handled via a single Core Network Control Node (CNN), such as e.g. MME, and the mobile node, after moving to the target CSG cell, remains in a registration area e.g. Tracking Area or Routing Area, which does not trigger a location registration, there will be no location registration. Thus an illegitimate mobile node could access a non-allowed CSG cell via handover. As the intelligent femtocell deployment strategy aims at avoiding Inter Core Network Control Node Handovers, such as e.g. inter- MME handovers this may be a most likely case. The known CSG based access control in the serving Core Network Control Node, such as e.g. MME, may thus not be triggered in a handover scenario, under some circumstances.

Third, a malicious mobile node aiming at getting access through a non-allowed CSG cell may simply omit the trailing location registration, even though the circumstances would normally trigger it, in order to avoid the CSG based access control.

Thus new mechanisms for access control in conjunction with handover into a subscriber group cell are needed.

SUMMARY

It is an object to obviate at least some of the above disadvantages and provide an improved performance within a communication network.

According to a first aspect, the object is achieved by a method in a network control node. The method aims at performing access control for a mobile node in a handover from a source cell to a target subscriber group cell. The source cell may be a subscriber group cell or a non subscriber group cell. The network control node, the source cell and the target subscriber group cell are comprised in a communication network. The method comprises obtaining a network based allowed subscriber group list, associated with the mobile node. Further, the method also comprises receiving a target subscriber group identification. In addition, the method further comprises checking if the target subscriber group identification is comprised in the obtained network based allowed subscriber group list. If it is, information from a target control node is obtained. The target control node is associated with the target subscriber group cell. The obtained information is verifying that the received subscriber group identification corresponds to the target subscriber group cell. Still further, the method comprises granting the mobile node access to the target subscriber group cell.

According to a second aspect, the object is also achieved by an arrangement in a network control node for performing access control for a mobile node in a handover from a source cell to a target subscriber group cell. The source cell may be a subscriber group cell or a non subscriber group cell. The network control node, the source cell and the target subscriber group cell are comprised in a communication network. The arrangement comprises a first obtaining unit. The first obtaining unit is adapted to obtain a network based allowed subscriber group list associated with the mobile node. Further, the arrangement comprises a receiving unit. The receiving unit is adapted to receive a target subscriber group identification. In addition, the arrangement comprises a checking unit. The checking unit is adapted to check if the target subscriber group identification is comprised in the obtained network based allowed subscriber group list. Also, the arrangement comprises a second obtaining unit. The second obtaining unit is adapted to obtain information from a target control node, which target control node is associated with the target subscriber group cell. Further yet, the arrangement comprises an access granting unit. The access granting unit is adapted to grant the mobile node access to the target subscriber group cell.

According to a third aspect, the object is also achieved by a method in a target control node. The method aims at assisting a network control node in performing access control for a mobile node in a handover from a source cell to a target subscriber group cell. The source cell may be a subscriber group cell or a non subscriber group cell. The target subscriber group cell is associated with the target control node.

The network control node, the target control node and the target subscriber group cell are comprised in a communication network. The method comprises receiving a request for handover, comprising a subscriber group identification. The subscriber group identification is associated with the target subscriber group cell. The request for handover is received from the network control node. The method further comprises sending a response to the network control node. The response is sent as a response to the received request for handover. The response comprises information for assisting the network control node in verifying that the received subscriber group identification corresponds to the subscriber group identity of the target subscriber group cell.

According to a fourth aspect, the object is also achieved by an arrangement in a target control node, for assisting a network control node in performing access control for a mobile node in a handover from a source cell to a target subscriber group cell. The target subscriber group cell is associated with the target control node. The network control node, the target control node and the target subscriber group cell are comprised in a communication network. The arrangement comprises a receiving unit. The receiving unit is adapted to receive a request for handover from the network control node, which request comprises a subscriber group identification. The subscriber group identification identifies the target subscriber group cell. In addition, the arrangement also comprises a sending unit. The sending unit is adapted to send a response to the received request for handover to the network control node. The response comprises information for assisting the network control node in verifying that the received subscriber group identification corresponds to the subscriber group identity of the target subscriber group cell.

Thanks to the present methods and arrangements, it is possible to prevent illegitimate mobile nodes from accessing a target node with restricted access early in a handover process. Thus it is possible to limit the consumed network resources when the mobile node is performing a handover from a source cell to a target cell. In particular, illegitimate mobile nodes are stopped before any radio resources are allocated in the target CSG cell. Thereby the probability of inappropriate network resource allocation is reduced and also some network signalling may be omitted. Thus an improved performance within a communication network is provided.

Other objects, advantages and novel features of the present methods and arrangements will become apparent from the following detailed description.

BRIEF DESCRIPTION OF THE DRAWINGS

The present invention will now be described more in detail in relation to the enclosed drawings, in which.

DETAILED DESCRIPTION

The present solution is defined as a method and an arrangement in a network control node and a method and an arrangement in a target network control node which may be put into practice in the embodiments described below. The present solution may, however, be embodied in many different forms and should not be construed as limited to the embodiments set forth herein; rather, these embodiments are provided so that this disclosure will be thorough and complete, and will fully convey the scope of the present solution. It should be understood that there is no intent to limit the present methods and/or arrangements to any of the particular forms disclosed, but on the contrary, the present methods and/or arrangements are to cover all modifications, equivalents, and alternatives falling within the scope of the present solution as defined by the claims.

The present solution may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

Figure 1:
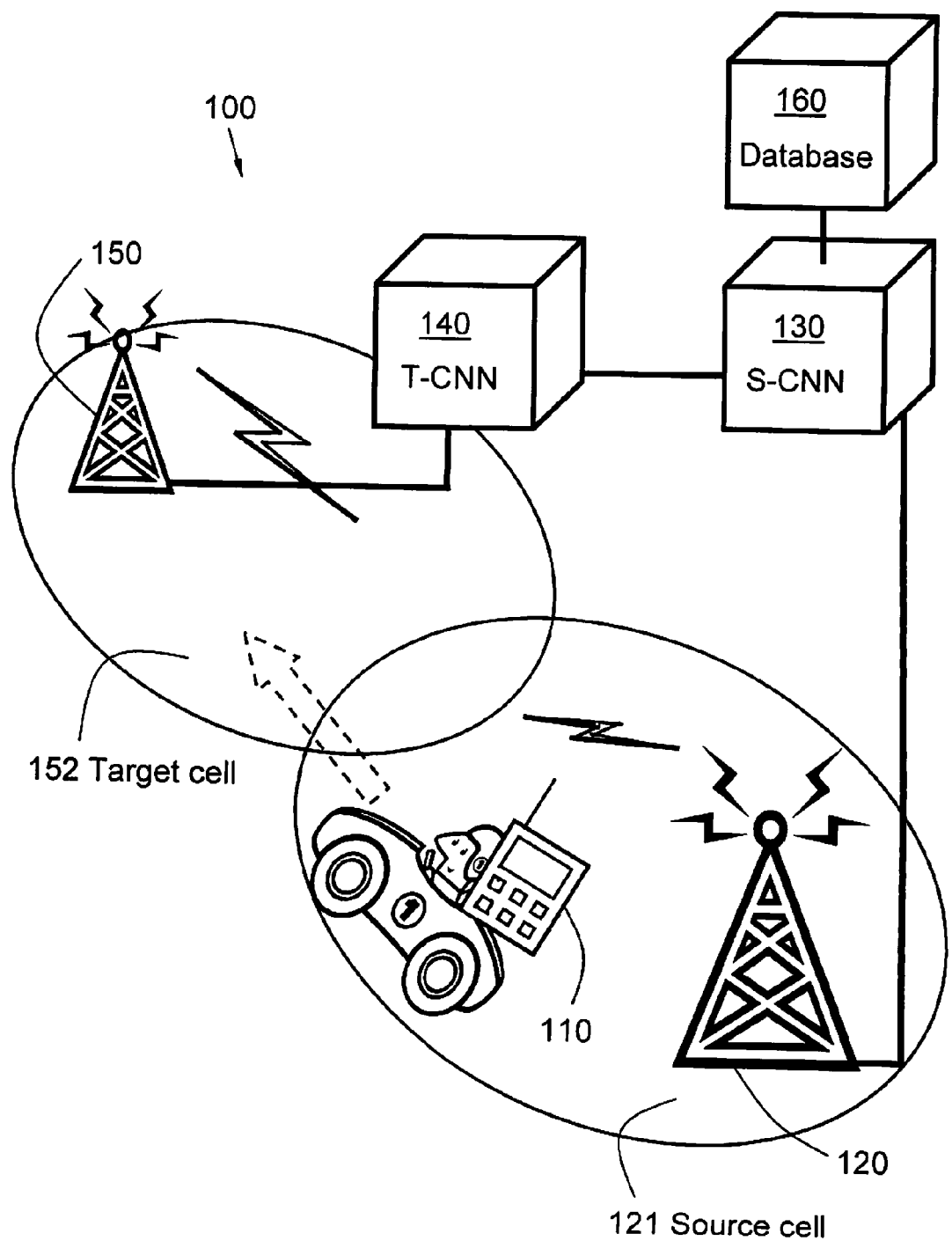
FIG. 1 is a schematic block diagram illustrating a communication network according to some embodiments.

FIG. 1 is a schematic illustration over a communication network 100. A mobile node 110 is moving from a source cell 121, which source cell 121 is associated with a network control node 120, such as a source network control node, into a target subscriber group cell 152. The target subscriber group cell 152 is associated with a target network control node 150. The network control node 120 is connected to a network control node 130, such as a core network control node (CNN) e.g. via a wired connection. Also, the target network control node 150 is connected to a target core network control node 140, such as a core network control node (CNN) e.g. via a wired connection. Further the network control node 130 and the target core network control node 140 are connected e.g. via a wired connection according to some embodiments. However, according to some embodiments, the network control node 130 and the target core network control node 140 may be collocated within the same core network control node 130. Further yet, the network control node 130 is connected to a database 160.

The mobile node 110 may, according to some embodiments be represented by a wireless communication device, a wireless communication terminal, a mobile cellular telephone, a Personal Communications Systems terminal, a Personal Digital Assistant (PDA), a laptop, a User Equipment (UE), computer or any other kind of device capable of managing radio resources.

The network control node 120 may according to some embodiments be referred to as a source control node, a Radio Access Network (RAN), a Radio Access Network Subsystem (RANS), or a HRANS. A HRANS is a RANS where the concerned base station is a Home (e)NodeB, i.e. either Home Node B or Home eNodeB. Possibly also comprising the Home (e)NodeB Gateway via which the Home (e)NodeB may be connected to the core network. However, the network control node 120 may be a source eNodeB or a source Home eNodeB in EPS, a source radio network subsystem i.e. a radio network controller and its connected NodeBs or a source Home Node B in 3G, or a source base station subsystem in 2G, depending on the radio access technology and terminology used. The source base station subsystem in 2G may comprise a base station controller and its connected radio base stations. In the subsequent description, the term source network control node 120 will be used, for enhanced clarity, but it is to be considered to correspond to any of the enumerated terms such as e.g. network control node 120.

The source cell 121 may be a CSG cell, a femtocell, a regular macrocell, or any other arbitrary kind of cell.

The network control node 130, which also may be referred to as core network control node (CNN), as well as the target core network control node 140 may be a Mobility Management Entity (MME) in EPC/E-UTRAN. In 2G and/or 3G, the source core network control node 130 and/or target core network control node 140 may be an SGSN or possibly a MSC/MSC server. In the subsequent description, the term core network control node 130 will be used, for enhanced clarity, but it is to be considered to correspond to any of the enumerated terms such as e.g. network control node 130.

The target network control node 150, may according to some embodiments be referred to as a Radio Access Network (RAN), a Radio Access Network Subsystem (RANS), or a HRANS. A HRANS is a RANS where the concerned base station is a Home (e)NodeB, i.e. either Home Node B or Home eNodeB. Possibly also comprising the Home (e)NodeB Gateway via which the Home (e)NodeB may be connected to the core network. The target base station subsystem in 2G may comprise a base station controller and its connected radio base stations. Further, according to some embodiments, the target network control node 150 may be represented by a Gateway (GW), such as e.g. a Home eNodeB Gateway.

The target subscriber group cell 152 may be a CSG cell, a femtocell, a regular macrocell with access restrictions, or any other arbitrary kind of cell with limited access. However, in the following illustrative exemplary embodiment, the target subscriber group cell 152 is embodied as a CSG cell.

The database 160 may be a Home Subscriber Server (HSS), or any other arbitrary database arranged to store data related to a subscriber. As an example, a network based Allowed CSG List (ACL), which also may be referred to as a white list, access control list or a network based allowed subscriber group list, may be stored at the database 160.

According to some embodiments, a target subscriber group identification may be comprised in the network based allowed subscriber group list associated with the mobile node 110. Thus the network based allowed subscriber group list, such as e.g. an Allowed CSG List (ACL), according to some embodiments may comprise a list of target subscriber group identification, associated with, or identifying, target subscriber group cells 152 that the mobile node 110 may be granted access to. Also, an optional time limit associated with the certain subscriber and/or mobile node 110, having a time limited access to the subscriber group cell 152 may be comprised within the network based allowed subscriber group list.

According to some embodiments, the Allowed CSG List (ACL) may exist in several places within the communication network 100. Thus the database 160, such as e.g. a HSS, may have a complete ACL list for one subscriber. The identification of subscribers in the database 160 may be made e.g. in the form of International Mobile Subscriber Identity (IMSI) code. This ACL list may comprise for each Public Land Mobile Network (PLMN) the allowed CSG IDs, which may be limited to e.g. 50 per PLMN, and their corresponding optional expiration timer. Alternatively, each subscriber may have one ACL for each PLMN, however it may be assumed that the CSG IDs of all PLMNs are comprised in the same ACL, i.e. a single comprehensive ACL per subscriber. The database 160 may send the ACL list as part of subscription data to MSC/SGSN/MME, but it may only send the part of the data that is applicable to this PLMN. Therefore it may be that the list in MME/SGSN/MSC is a part of the full ACL list, or the full ACL list if the user only has CSG Id in one PLMN, which may be assumed to be a common case. In the subscription data in the database 160, MSISDN may be one of the parameters, but the main usage in MME or SGSN may be to add the MSISDN in certain messages on certain interfaces.

The mobile node 110 may be assumed to get a complete ACL list from a server in the Home Public Land Mobile Network (HPLMN), and this server may in turn get the list from the database 160, according to some embodiments. However, it may be that e.g. the ACL list may be configured into the mobile node 110 such that the subscriber for example is a H(e)NB owner that only needs to access its own CSG Id.

The H(e)NB owner may according to some embodiments allow a friend to access its H(e)NB CSG Id, e.g. for a limited period of time. The H(e)NB owner may e.g. access a portal in the HPLMN, to add identities of all mobile nodes, or rather subscribers using the mobile nodes, that may be allowed to access his/her H(e)NBs CSG Id. And to facilitate for a private person such as the H(e)NB owner to add a friends identity, it seems like a user friendly choice to use the MSISDN i.e. the phone number of the friend for identifying the friend/other mobile node. Further, the portal may be configured to translate the MSISDN into an IMSI to be able to add this into the database 160 in some way.

The communication system 100 may be based on technologies such as e.g. System Architecture Evolution/Long Term Evolution (SAE/LTE), Evolved Packet Core/Evolved Universal Terrestrial Radio Access Network (EPC/E-UTRAN), Evolved Packet System (EPS), Global System for Mobile communications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS) etc, just to mention some few arbitrary and none limiting examples.

Any, some or all nodes comprised within the communication system 100 may be connected together with communication links for operating and maintenance purpose.

One or more embodiments herein introduce access control mechanisms to be used at handover into a target subscriber group cell 152. These mechanisms are based on checking that the target subscriber group identification of the target subscriber group cell 152 is comprised in the mobile node's 110 network based allowed subscriber group list. The allowed subscriber group list actually pertains to a subscriber rather than the mobile node 160, but the allowed subscriber group list may also be stored in the mobile node 160 the subscriber is using and for simplicity it may be more convenient to refer to the allowed subscriber group list as pertaining to the mobile node 160, as a sort of proxy for the subscriber using the mobile node 160.

The network based allowed subscriber group list is provided by the database 160 to the core network control node 130. The core network control node 130 may be e.g. an MME in EPC/E-UTRAN. The target subscriber group identification of the target subscriber group cell 152 is provided either by the mobile node 110 or by the target network control node 150, which is adapted to control the target subscriber group cell 152. The target network control node 150 may be e.g. a HeNB in EPC/E-UTRAN, according to some embodiments. The actual check may be performed by the source core network control node 130. The source core network control node 130 may be e.g. an MME, an MSC or an SGSN, just to mention some possible options, according to some embodiments. Alternatively, as a possible variation, the actual check may be performed by the source network control node 120 according to some embodiments. The source network control node 120 may be e.g. an eNB or an RNC. If this access control is based on a target cell target subscriber group identification provided by the mobile node 110, then the target network control node 150 controlling the target subscriber group cell 152 may verify that the target subscriber group identification provided by the mobile node 110 actually matches the target subscriber group identification of the target subscriber group cell 152 before the mobile node 110 can be granted access to the target subscriber group cell 152, so that the handover can be concluded. Optionally, the mobile node 110 can prune the set of candidate target subscriber group cells 152 by checking that the target subscriber group identification of the candidate target subscriber group cell 152 is included in the mobile node 110 based allowed subscriber group list before reporting the target subscriber group cell 152 as a candidate target cell.

Cases that may be relevant to consider for the present solution comprises both handover from a source cell 121 to a target subscriber group cell 152 based on the same Radio Access Technology (intra-RAT handover) as well as handover between cells 121, 152 based on different Radio Access Technologies (inter-RAT handover). Further, the source cell 121 may be, according to some embodiments, a subscriber group cell such as e.g. a CSG cell.

The intra-RAT handover cases may comprise e.g. intra-LTE and intra-3G handovers.

The inter-RAT handover cases may comprise handover from 2G to 3G, e.g. from GERAN to UTRAN. Another inter-RAT handover case may be from 3G to EPC/E-UTRAN, e.g. from UTRAN to E-UTRAN. Yet an example of an inter-RAT handover case may be from EPC/E-UTRAN to 3G, e.g. from E-UTRAN to UTRAN. The presently described methods may also be applied for e.g. a handover from 2G to EPC/E-UTRAN.

Figure 2:
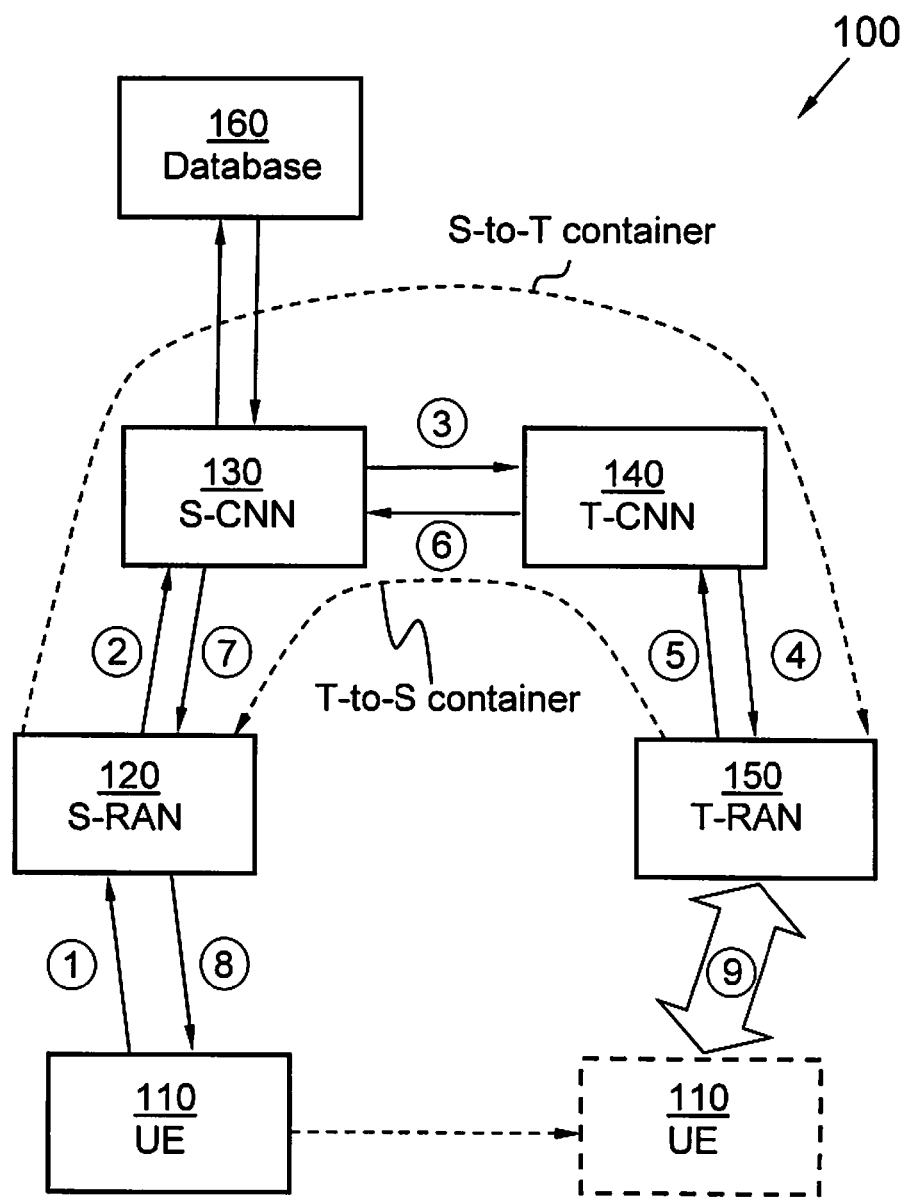
FIG. 2 is a block diagram illustrating a communication network according to some embodiments.

FIG. 2 is a schematic illustration over the communication network 100 and illustrates generic signalling for inter-core network control node handover cases. If the Core Network pool concept is used, it is assumed that the source core network control node 130 and target core network control node 140 belong to different pools.

Figure 3:
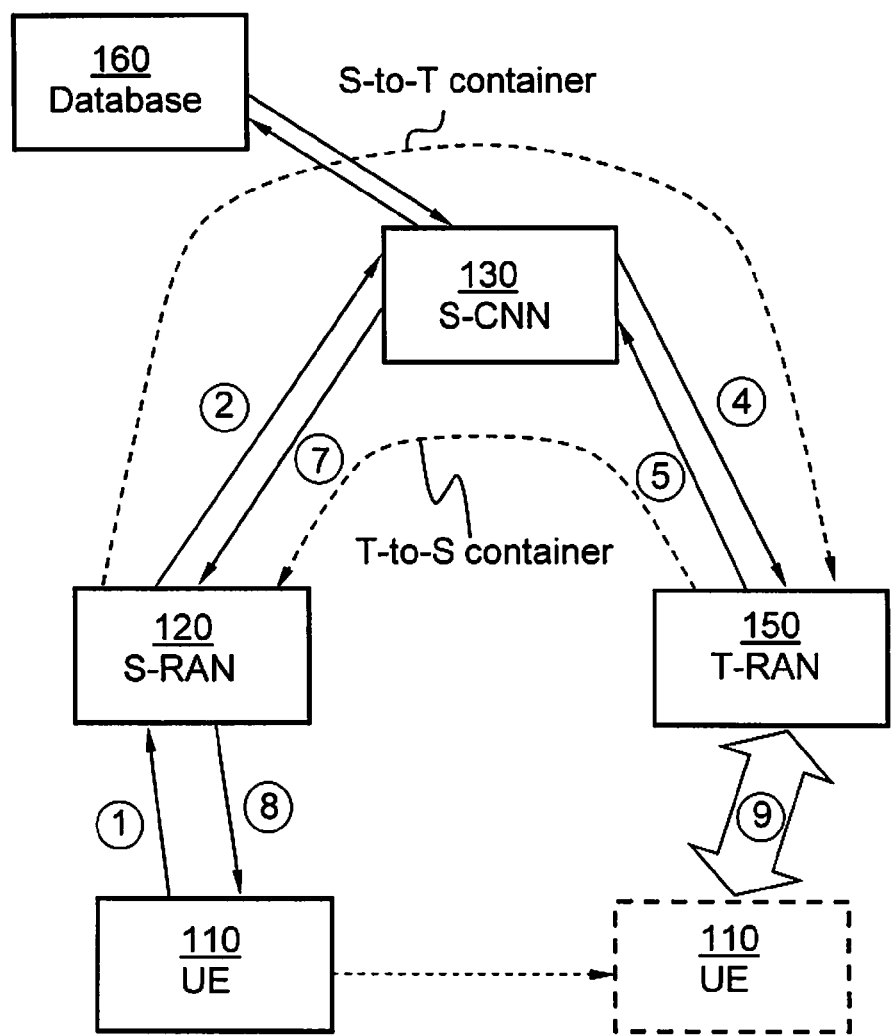
FIG. 3 is a block diagram illustrating a communication network according to some embodiments.

FIG. 3 is a schematic illustration over the communication network 100 and illustrates generic signalling for intra-core network control node handover cases.

The following is a generic description of the signalling in FIG. 2 and FIG. 3. The numbers 1-9 are denoting some of the signalling messages and commands sent between the entities comprised within the communication network 100.

Message 1

The mobile node 110 reports measurements and identity/identities of neighbouring candidate target subscriber group cells 152 for handover. The candidate target subscriber group cell 152 may be e.g. a CSG cell. This may be a Radio Resource Control message (RRC message) such as e.g. a MeasurementReport in E-UTRAN.

Message 2-4

Message 2-4 may comprise signals involving handover preparation. As a non limiting example e.g. in EPC/E-UTRAN: 2=HANDOVER REQUIRED, which may be a S1 Application Protocol (S1AP) message, 3=Forward Relocation Request which may be a GPRS Tunneling Protocol (GTP) message, 4=HANDOVER REQUEST, which may be a S1AP message. S1 is the interface between the radio access network and the core network in EPS, i.e. between eNodeB and MME/Serving Gateway.

Message 5-7

Signals confirming that handover preparations are ready. E.g. in EPC/E-UTRAN: 5=HANDOVER REQUEST ACKNOWLEDGE, which may be a S1AP message, Forward Relocation Response, which may be a GTP message, 7=HANDOVER COMMAND, which may be a S1AP message.

Message 8

Command to execute handover. A non limiting example of such command may be e.g. RRCConnectionReconfiguration, which may be a RRC message, in E-UTRAN.

Message 9

Further signalling involving the mobile node 110, the target network control node 150 and the target core network control node 140, i.e. the signalling involves also the target core network control node 140 even though the figures only show this action between the mobile node 110 and the target network control node 150.

S-to-T Container

Data may be transferred from the source network control node 120 to the target network control node 150 via signalling messages 2-4, e.g. in a S-to-T container according to some embodiments. This data may not be interpreted by the source core network control node 130 and/or the target core network control node 140.

T-to-S Container

Data may be transferred from the target network control node 150 to the source network control node 120 via signalling messages 5-7, e.g. in a T-to-S container according to some embodiments. This data may not be interpreted by the source core network control node 130 and/or the target core network control node 140.

The present solution may be applicable both to intra-RAT and inter-RAT cases. Furthermore, the present solution may be applied in communication network 100 wherein all involved entities support the CSG concept and/or wherein the source network control node 120 does not support the CSG concept, according to some embodiments. However, according to some embodiments core network control node 130 may not support the CSG concept.

In general the present access control mechanism at handover into a cell may comprise three steps, step A-C:

Step A

Optional early filtering. The mobile node 110 may report target cell 152 and target subscriber group identification, such as e.g. the CSG ID of the target cell 152 to the source network control node 120 only if the target subscriber group identification is included in the mobile node 110 based allowed subscriber group list, which may also be referred to as an Allowed CSG List (ACL), or a CSG Whitelist, or just Whitelist. If the target cell 152 is a non-CSG cell, the mobile node 110 may report an empty/void target subscriber group identification parameter to the source network control node 120. If the mobile node 110 does not support the CSG concept, it may not report any target subscriber group identification parameter at all. This step is optional, e.g. as all mobile nodes 110 may support the CSG concept.

Step B

Check the target subscriber group identification against the allowed subscriber group list i.e. the network based allowed subscriber group list obtained from the database 160. The database 160 may be a Home Subscriber Server (HSS). The handover may be admitted if the target subscriber group identification is comprised in the mobile node node's network based allowed subscriber group list, according to some embodiments.

Step C

The target network control node 150 checks that the target subscriber group identification reported by the mobile node 110 matches the subscriber group identification of the actual target cell 152, e.g. as identified by the reported cell ID. If the target subscriber group identification reported by the mobile node 110 does not match the subscriber group identification of the target cell 152, access grant may not be given and thus the handover process may be discontinued. Note that an empty/void target subscriber group identification parameter implies a non-CSG target cell 152 and may thus not match any subscriber group identification at all. Thus the check may fail if the target cell 152 is a CSG cell. This step C may be performed only if step B is based on a target subscriber group identification reported by the mobile node 110, according to some embodiments.

Step A may thus be optional and step C may be conditional, according to some embodiments. The order of step B and step C may be reversed.

The following is the behaviour of each of the involved entities in order to support the above described access control mechanism:

Mobile Node 110

If the mobile node 110 supports the CSG concept, it reports a target subscriber group identification parameter, i.e. a parameter intended to comprise the subscriber group identification of a handover candidate target cell 152 to the source network control node 120 in a measurement report. If the candidate target cell 152 is a CSG cell, the target subscriber group identification parameter comprises the CSG ID of the candidate target cell 152. If the candidate target cell 152 is a non-CSG cell, the target subscriber group identification parameter is empty/void. The mobile node 110 may also perform access control as previously described under step A, i.e. selective filtering of candidate target CSG cells 152 to report.

If the mobile node 110 does not support the CSG concept, it may not report any target subscriber group identification parameter to the source network control node 120 in a measurement report and may further not perform access control step A.

In one variant, illustrated as example procedure 2 below the mobile node 110 does not report any target subscriber group identification parameter to the source network control node 120, even if the mobile node 110 does support the CSG concept.

Source Network Control Node 120

The source network control node 120 may receive the network based allowed subscriber group list of a mobile node 110 from the core network control node 130 when a connection and/or context between the source network control node 120 and core network control node 130 is established for the mobile node 110, according to some embodiments. In EPC/E-UTRAN, for instance, the S-(H)eNB may receive the allowed subscriber group list in the S1AP INITIAL CONTEXT SETUP REQUEST message from the source MME when the S1 connection is established for the mobile node 110.

If the source network control node 120 supports the CSG concept and receives a target subscriber group identification parameter from the mobile node 110 and the source network control node 120 has not received the mobile node's 110 network based allowed subscriber group list from the core network control node 130, then the source network control node 120 forwards the target subscriber group identification parameter in signalling message 2 to the core network control node 130 and to the target network control node 150 in the S-to-T-container. Optionally, according to some embodiments it may be forwarded to the core network control node 130.

If the source network control node 120 supports the CSG concept and receives a target subscriber group identification parameter from the mobile node 110 and has received the mobile node's 110 network based allowed subscriber group list from the core network control node 130, then the source network control node 120 may perform access control step B, provided that the target subscriber group identification parameter was non-empty/void. If the access control performed results in accepted access, the source network control node 120 forwards the target subscriber group identification parameter to the target network control node 150 in the S-to-T container. If the access control performed results in denied access, the source network control node 120 may not proceed with the handover signalling according to some embodiments.

If the source network control node 120 does not receive any target subscriber group identification parameter from the mobile node 110, it may not perform access control step B and may thus not forward any target subscriber group identification parameter neither to the core network control node 130 nor to the target network control node 150, according to some embodiments.

If the source network control node 120 does not support the CSG concept, it may discard any target subscriber group identification parameter received from the mobile node 110. Thus according to some embodiments it may not perform access control step B and may accordingly not forward any target subscriber group identification parameter, neither to the core network control node 130 nor to the target network control node 150.

Note that the described behaviour applies also when the source network control node 120 is S-HRANS i.e. the source Node B/eNodeB is a Home Node B or Home eNodeB.

Core Network Control Node 130

When a connection, and context between the core network control node 130 and the source network control node 120 is established for the mobile node 110, the core network control node 130 may forward the mobile node's 110 network based allowed subscriber group list to the source network control node 120. In EPC/E-UTRAN, for instance, the source-MME may forward the allowed subscriber group list to the source-(H)eNB in the S1AP INITIAL CONTEXT SETUP REQUEST message, according to some embodiments.

If the core network control node 130 receives a target subscriber group identification parameter from the source network control node 120 in signalling message 2, the core network control node 130 may perform access control step B, according to some embodiments.

If the core network control node 130 does not receive any target subscriber group identification parameter from the source network control node 120 in signalling message 2, the core network control node 130 may, according to some embodiments send the mobile node's 110 network based allowed subscriber group list to the target network control node 140 in signalling message 3.

Else, if none of the above is performed, if the core network control node 130 receives a target subscriber group identification from the target network control node 140 in signalling message 6, the core network control node 130 may perform access control step B.

If the core network control node 130 does not support the CSG concept, the core network control node 130 may not perform any of the above described method steps, according to some embodiments.

In all cases the core network control node 130 forwards the S-to-T container in signalling message 3 and the T-to-S container in signalling message 7.

Target Network Control Node 140

If the target network control node 140 receives the mobile node's 110 network based allowed subscriber group list from the source network control node 120, or if the target network control node 140 and the core network control node 130 are the same entity, such as i.e. SIT-CNN, the target network control node 140 may forward the allowed subscriber group list to the target network control node 150 in signalling message 4, according to some embodiments. However, according to other embodiments, the target network control node 140 may perform access control step B after receiving the target subscriber group identification in signalling message 5 from the target network control node 150.

If the target network control node 140 does not receive the mobile node's 110 network based allowed subscriber group list from the core network control node 130, but does receive the target subscriber group identification from the target network control node 150 in signalling message 5, then the target network control node 140 according to some embodiments may forward the target subscriber group identification to the core network control node 130 in signalling message 6. The target subscriber group identification may be provided in message 6 in order to support CSG based charging, i.e. not only for the purpose of access control.

In the herein discussed cases, the target network control node 140 may forward the S-to-T container in signalling message 4 and the T-to-S container in signalling message 6.

Target Network Control Node 150

If the target network control node 150 receives a target subscriber group identification parameter with a value or empty/void in the S-to-T container, then the target network control node 150 may perform access control step C, according to some embodiments.

If the target network control node 150 receives the mobile node's 110 network based allowed subscriber group list in signalling message 4 from the target network control node 140, then the target network control node 150 according to some embodiments may perform access control step B.

If the target network control node 150 does not receive any target subscriber group identification parameter in the S-to-T container, then the target network control node 150 may send the target subscriber group identification, i.e. the actual subscriber group identification of the target cell in signalling message 5 to the target network control node 140.

Obviously, the above described entity behaviours comprises several options and possible resulting procedures. Some such resulting procedures will now be further described in association with the presentation of FIGS. 4-9 below.

Figure 4:
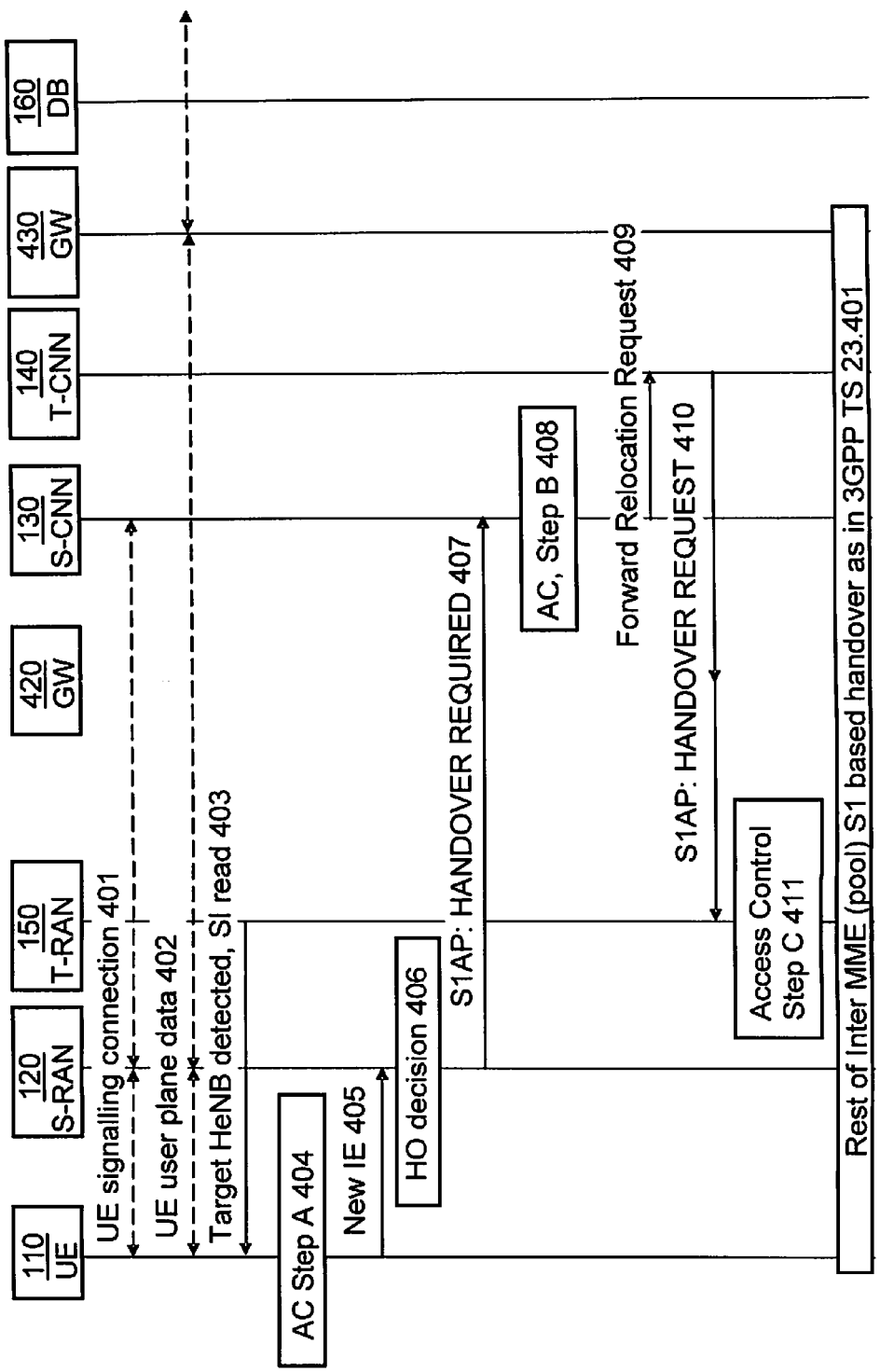
FIG. 4 is a combined signalling scheme and block diagram illustrating method embodiments in a communication network.

FIG. 4 is a combined signalling scheme and block diagram illustrating method embodiments in a communication network. In particular a procedure in EPC/E-UTRAN inter-MME handover case is illustrated.

Step 401

The mobile node 110 may establish a signalling connection with the source network control node 120, which source network control node 120 in turn may establish a signalling connection with a core network control node 130. The core network control node 130 may be represented e.g. by a source Mobility Management Entity.

Step 402

Further, the mobile node 110 may send user plane data to the source network control node 120, which source network control node 120 may be e.g. an eNodeB, or a Home eNodeB in EPC/E-UTRAN. The source network control node 120 may forward the user plane data to a serving Gateway, which in turn sends it to a Gateway 430. The Gateway 430 may according to some embodiments comprise the Serving Gateway and Packet Data Network Gateway (PDN GW). However these nodes may be separate entities. According to some embodiments, a Home eNodeB Gateway may handle the user plane also between the Home eNodeB and Serving Gateway.

Step 403

A target network control node 140 may be detected and System Information (SI) read.

Step 404

According to some embodiments, an access control according to the previously described step A may be performed at the mobile node 110.

Thus the mobile node 110 may report target cell 152 and target subscriber group identification, such as e.g. the CSG ID of the target cell 152 to the source network control node 120 only if the target subscriber group identification is included in the mobile node 110 based allowed subscriber group list.

Step 405

A new Information Element (IE) comprising e.g. target subscriber group identification such as e.g. CSG ID, eNodeB ID, Tracking Area Identity (TAI) of target cell 152, e.g. a target CSG cell, may be sent from the mobile node 110 to the source network control node 120. This may correspond to the previously described message 1, according to some embodiments.

Step 406

A handover (HO) decision may be taken in the source network control node 120, to initiate a handover process for the mobile node 110, from the source cell 121 to the target cell 152.

Step 407

A S1 Application Protocol (S1AP) Handover required message may be sent from the source control node 120 to the core network control node 130. The message in step 407 may correspond to the previously described message 2 and may comprise the new Information Element (IE) comprising e.g. target subscriber group identification such as e.g. CSG ID, together with other Information Elements comprising e.g. eNodeB ID, Tracking Area Identity (TAI) of target cell 152, e.g. a target CSG cell. An S-to-T container, as previously defined, may be sent comprising e.g. the new Information Element comprising e.g. target subscriber group identification such as e.g. CSG ID, eNodeB ID, Tracking Area Identity (TAI) of target cell 152, e.g. a target CSG cell, and E-UTRAN Cell Global Identity (ECGI).

Step 408

According to some embodiments, an access control according to the previously described step B may be performed at the core network control node 130.

Thus, according to some embodiments, the target subscriber group identification may be checked against the allowed subscriber group list i.e. the network based allowed subscriber group list obtained from the database 160 when the original session was established. The database 160 may be a Home Subscriber Server (HSS). The handover can be admitted only if the target subscriber group identification is included in the mobile node 110's network based allowed subscriber group list.

Step 409

A forward relocation request may be sent from the core network control node 130 to the target network control node 140. The target network control node 140 may be represented by a target MME in EPC/E-UTRAN. The forward relocation request may among other parameters comprise an S-to-T container, as previously defined, comprising e.g. the new Information Element comprising e.g. target subscriber group identification such as e.g. CSG ID, together with other Information Elements comprising e.g. eNodeB ID, Tracking Area Identity (TAI) of target cell 152, e.g. a target CSG cell, and E-UTRAN Cell Global Identity (ECGI).

Step 410

A S1 Application Protocol (S1AP) Handover request message may be sent from the target network control node 140 to the target network control node 150, possibly via a gateway 420, which gateway 420 may be a Home eNodeB gateway. This step 410 may correspond to the previously described message 4.

Step 411

According to some embodiments, an access control according to the previously described step C may be performed at the target network control node 150.

However, according to some embodiments, an access control according to the previously described step C may be performed at the gateway 420, which may be a Home eNodeB gateway.

Thus the target network control node 150 or alternatively the gateway 420 may check that the target subscriber group identification reported by the mobile node 110 matches the subscriber group identification of the actual target cell 152, e.g. as identified by the reported cell ID. If the target subscriber group identification reported by the mobile node 110 does not match the subscriber group identification of the target cell 152, the handover may not be allowed and the handover procedure may be discontinued.

If the target subscriber group identification corresponds to the subscriber group identification of the actual target cell 152, the rest of the Inter MME S1 based handover may be performed as specified in 3GPP TS 23.401, according to some embodiments.

Figure 5:
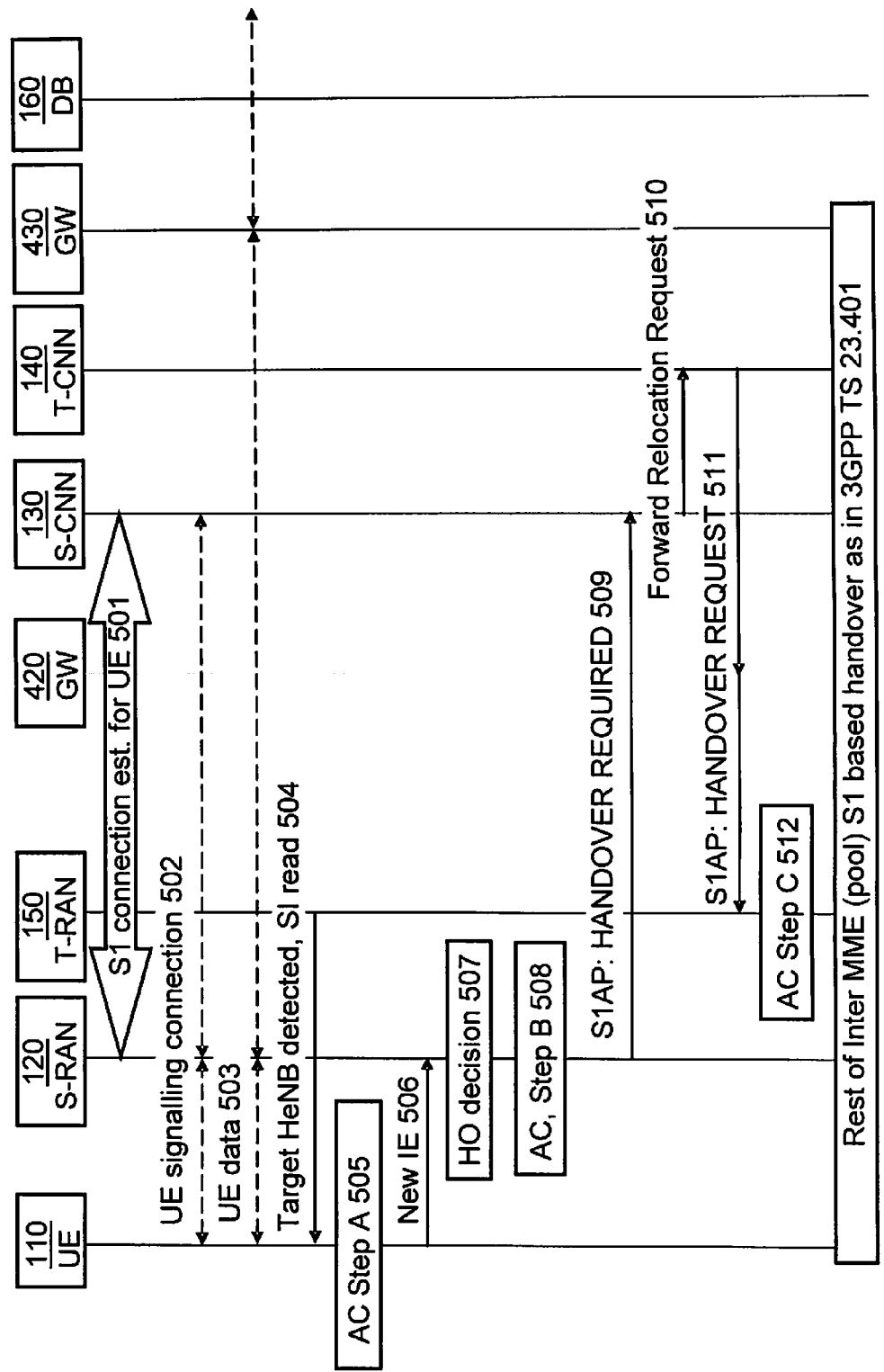
FIG. 5 is a combined signalling scheme and block diagram illustrating method embodiments in a communication network.

FIG. 5 is a combined signalling scheme and block diagram illustrating method embodiments in a communication network. In particular a procedure in EPC/E-UTRAN inter-MME handover case, according to some embodiments is illustrated.

Step 501

In a first step, an S1 connection establishment for the mobile node 110, wherein the core network control node 130, which core network control node 130 may be an MME, transfers the mobile node's 110 allowed subscriber group list to the source network control node 120. The source network control node 120 may be represented e.g. by a source Home eNodeB or an eNodeB, according to some embodiments.

Step 502

Further, the mobile node 110 may establish a signalling connection with the source network control node 120, which source network control node 120 in turn may establish a signalling connection with a core network control node 130. The core network control node 130 may be represented e.g. by a source Mobility Management Entity.

Step 503

The mobile node 110 may send user plane data to the source network control node 120, which source network control node 120 may be an eNodeB, or a Home eNodeB in EPC/E-UTRAN. The source network control node 120 may forward the user plane data to a serving Gateway, which in turn sends it to a Gateway 430. The Gateway 430 may comprise, according to some embodiments, the Serving Gateway and Packet Data Network Gateway (PDN GW). However these nodes may be separate entities. However, according to some embodiments, a Home eNodeB Gateway may handle the user plane also between the Home eNodeB and Serving Gateway.

Step 504

A target network control node 140 may be detected and System Information (SI) read.

Step 505

According to some optional embodiments, an access control according to the previously described step A may be performed at the mobile node 110.

Thus the mobile node 110 may report target cell 152 and target subscriber group identification, such as e.g. the CSG ID of the target cell 152 to the source network control node 120 only if the target subscriber group identification is included in the mobile node 110 based allowed subscriber group list, according to some embodiments.

Step 506

A new Information Element comprising e.g. target subscriber group identification such as e.g. CSG ID, together with other Information Elements comprising e.g. eNodeB ID, Tracking Area Identity of target cell 152, e.g. a target CSG cell, may be sent from the mobile node 110 to the source network control node 120. This may correspond to the previously described message 1, according to some embodiments.

Step 507

A handover (HO) decision may be taken in the source network control node 120, to initiate a handover process for the mobile node 110, from the source cell 121 to the target cell 152.

Step 508

According to some embodiments, an access control according to the previously described step B may be performed at the core network control node 130.

Thus, according to some embodiments, the target subscriber group identification may be checked against the allowed subscriber group list i.e. the network based allowed subscriber group list obtained from the database 160 when the original session was established. The database 160 may be a Home Subscriber Server (HSS). The handover may be admitted only if the target subscriber group identification is comprised in the mobile node 110's network based allowed subscriber group list, according to some embodiments.

Step 509

A S1 Application Protocol (S1AP) Handover required message may be sent from the source network control node 120 to the core network control node 130. The message in step 407 may correspond to the previously described message 2 and may comprise the new Information Element comprising e.g. target subscriber group identification such as e.g. CSG ID, together with other Information Elements comprising e.g. eNodeB ID, Tracking Area Identity of target cell 152, e.g. a target CSG cell. An S-to-T container, as previously defined, may be sent comprising e.g. the new Information Element comprising e.g. target subscriber group identification such as e.g. CSG ID, together with other Information Elements comprising e.g. eNodeB ID, Tracking Area Identity of target cell 152, e.g. a target CSG cell, and E-UTRAN Cell Global Identity (ECGI).

Step 510

A forward relocation request may be sent from the core network control node 130 to the target network control node 140. The target network control node 140 may be represented by a target MME in EPC/E-UTRAN. The forward relocation request may among other parameters comprise an S-to-T container, as previously defined, comprising e.g. the new Information Element comprising e.g. target subscriber group identification such as e.g. CSG ID, together with other Information Elements comprising e.g. eNodeB ID, Tracking Area Identity of target cell 152, e.g. a target CSG cell, and E-UTRAN Cell Global Identity (ECGI).

Step 511

A S1 Application Protocol (S1AP) Handover request message may be sent from the target network control node 140 to the target network control node 150, possibly via a gateway 420, which gateway 420 may be a Home eNodeB gateway. This step 511 may correspond to the previously described message 4.

Step 512

According to some embodiments, an access control according to the previously described step C may be performed at the target network control node 150.

However, according to some embodiments, an access control according to the previously described step C may be performed at the gateway 420, which may be a Home eNodeB gateway.

Thus the target network control node 150 or, alternatively, the gateway 420 may check that the target subscriber group identification reported by the mobile node 110 matches the subscriber group identification of the actual target cell 152, e.g. as identified by the reported cell ID. If the target subscriber group identification reported by the mobile node 110 does not match the subscriber group identification of the target cell 152, the handover may not be allowed and the handover procedure may be discontinued, according to some embodiments.

If the target subscriber group identification corresponds to the subscriber group identification of the actual target cell 152, the rest of the Inter MME S1 based handover may, according to some embodiments be performed as specified in 3GPP TS 23.401.

Among the above example procedures a particular selection criterion may be that an illegitimate mobile node 110 should be stopped as early as possible, in particular before any radio resources are allocated in the target network control node 150. Therefore embodiments of the present solutions may be directed towards barring illegitimate mobile node 110 early in the handover process, preferably before the handover has been executed, in order to reduce signalling within the communication network 100 and in order not to allocate resources unnecessarily to the illegitimate mobile node 110, e.g. in the source network control node 120, or in the core network control node 130.

If the access control fails before any radio resources are allocated in the target network control node 150, as e.g. in the above described example procedures, the handover may be stopped with reject messages, such as e.g. an S1AP HANDOVER FAILURE message between the target network control node 150 and the target network control node 140 and/or an S1AP HANDOVER PREPARATION FAILURE message, between the core network control node 130 and the source network control node 120 in EPS. If the access control fails after radio resources have been allocated in the target network control node 150, the handover may be aborted through other means, e.g. involving an S1AP HANDOVER CANCEL message in EPC/E-UTRAN.

The present methods and arrangements provide improved mechanisms for access control of mobile nodes 110 during, or before, handover into a subscriber group cell 152, such as e.g. a CSG cell. The present mechanisms allow an illegitimate mobile node 110 to be barred from access early in the handover procedure; in particular before any radio resources are allocated in the target subscriber group cell 152, which minimizes the possible failure cases.

In addition, the present methods and arrangements may be performed without introduction of additional messages, compared to the non-subscriber group handover scenarios, thereby avoiding an increased latency for the subscriber group enabled mobile nodes 110, such as CSG-enabled mobile nodes 110.

Without specific access control mechanisms for handover into a target subscriber group cell 152, the subscriber group based access control used for other, non-handover network access cases such as e.g. Attach and Service Request in EPC/E-UTRAN would have to be used also during handover into subscriber group cells 152.

An advantage with the present methods and arrangements is that an access control mechanism is provided early in a handover process, i.e. before resources are allocated in the target network control node 150 and released in the source network control node 120 and the mobile node 110 is already communicating via the target network control node 150. Thus unnecessary allocation of resources may be omitted or at least somewhat reduced.

Further, the present methods and arrangements may improve the access control mechanism in handover scenarios when the movement to the target CSG cell does not trigger a location registration.

Also, in addition, the present methods and arrangements may prevent or at least somewhat reduce the possibility for a malicious mobile node 110 to avoid access control, by omitting the location registration following the handover.

Figure 6:
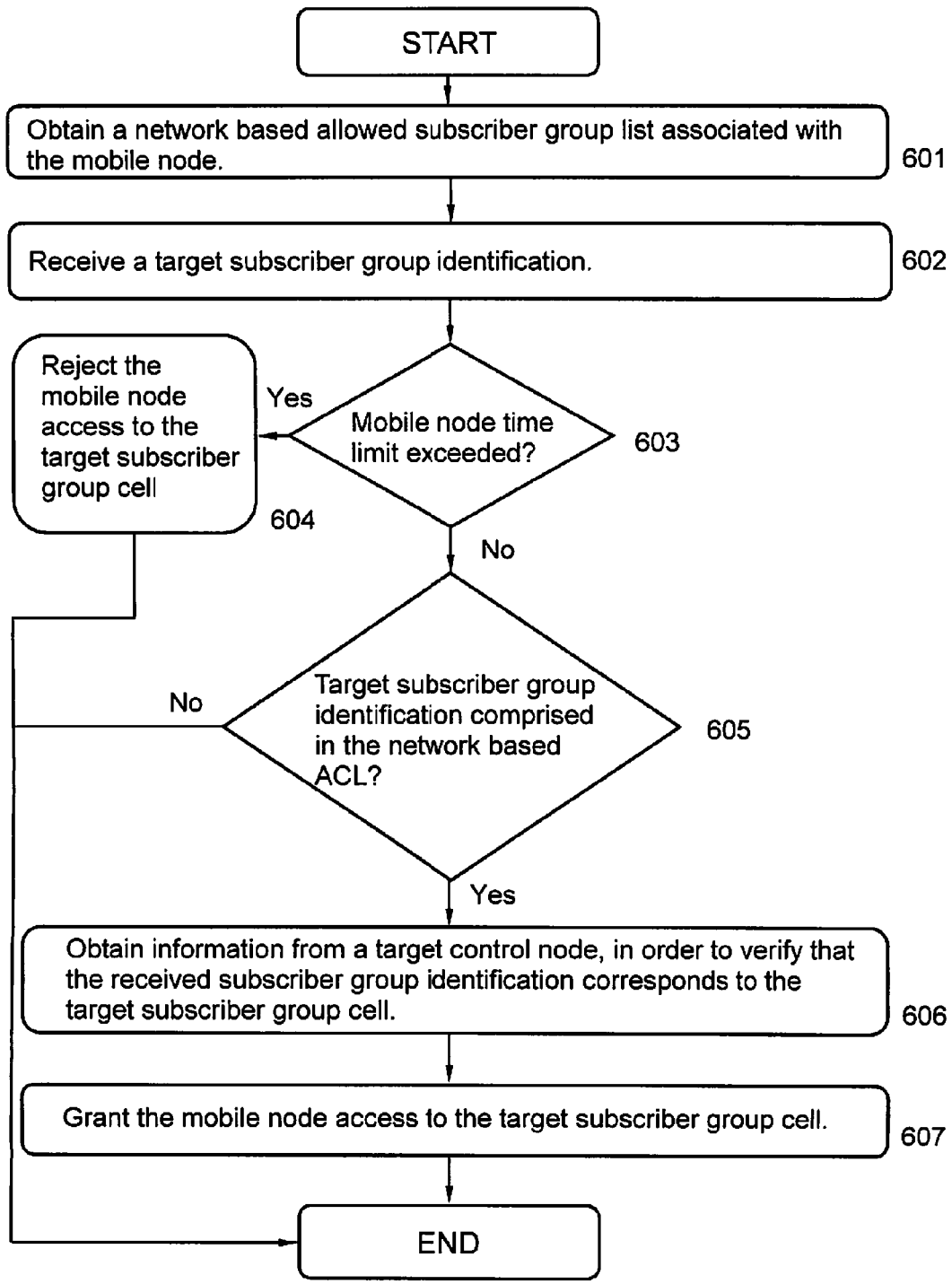
FIG. 6 is a flow chart illustrating embodiments of a method in a network control node.

FIG. 6 is a flow chart illustrating embodiments of method steps 601-607 performed in a network control node 120, 130. The method aims at performing access control for a mobile node 110 in a handover from a source cell 121 to a target subscriber group cell 152. The network control node 120, 130, the source cell 121 and the target subscriber group cell 152 are comprised in a communication network 100.

The network control node 120, 130 may be a core network control node 130, represented by an entity comprised in the group: Mobility Management Entity (MME), Serving General Packet Radio Service Support Node (SGSN), Mobile Switching Centre (MSC), according to some embodiments.

However, according to some embodiments, the network control node 120, 130 may be a source network control node 120, represented by a Radio Access Network. The Radio Access Network may comprise any, some or a plurality of e.g. a Radio Access Network Subsystem, an eNodeB, a nodeB, a radio network subsystem, a Radio Network Controller, a base station subsystem, a Home eNodeB, a Home NodeB, a Home eNodeB Gateway and/or a Home NodeB Gateway.

Further, according to some optional embodiments, the network control node 120, 130 may comprise, or be connected to, a time measurement unit 730.

The target subscriber group cell 152 may according to some embodiments be a Closed Subscriber Group cell (CSG cell). Further, the received target subscriber group identification may optionally be a Closed Subscriber Group ID (CSG ID).

The source cell 121 may according to some embodiments be a subscriber group cell such as e.g. a Closed Subscriber Group cell (CSG cell). However, according to some embodiments, the source cell 121 may be a cell with non restricted access.

To appropriately perform an access control for a mobile node 110 in a handover from a source cell 121 to a target subscriber group cell 152, the method may comprise a number of method steps 601-607.

It is however to be noted that some of the described method steps 601-607 are optional and only comprised within some embodiments. Further, it is to be noted that the method steps 601-607 may be performed in another chronological order than illustrated in this exemplary embodiment and that some method steps, e.g. step 601 and step 602, or even all steps 601-607 may be performed simultaneously or in an altered or rearranged chronological order, according to different embodiments. The method may comprise the following steps:

Step 601

A network based allowed subscriber group list, associated with the mobile node 110 is obtained.

The network based allowed subscriber group list may be e.g. an Allowed Closed Subscriber Group List (ACL), which also may be referred to as a Closed Subscriber Group Whitelist.

The network based allowed subscriber group list associated with the mobile node 110 may be obtained from a database 160, such as a Home Subscriber Server (HSS).

Step 602

A target subscriber group identification is received.

The target subscriber group identification may be e.g. a Closed Subscriber Group identification (CSG ID).

Step 603

This step is optional and may only be performed within some embodiments.

A check may be performed, in order to check if a time limit value associated with the mobile node 110 is exceeded. The check may be performed by making a comparison with a time measurement value obtained from the time measurement unit 730.

Step 604

This step is optional and may only be performed within some embodiments.

If the time limit value associated with the mobile node 110 is exceeded, the mobile node 110 may be rejected access to the target subscriber group cell 152.

By performing a check concerning whether a time limited access has expired, and reject such mobile nodes with expired time limited access early in the handover process, unnecessary resource allocation and network signalling may be avoided or reduced.

Step 605

It is checked within the network control node 120, 130 if the target subscriber group identification is comprised in the obtained network based allowed subscriber group list.

Step 606

If the target subscriber group identification is comprised in the network based allowed subscriber group list, information from a target network control node 150 is obtained. The target network control node 150 is associated with the target subscriber group cell 152, wherein the information is verifying that the received subscriber group identification corresponds to the target subscriber group cell 152.

The target network control node 150 may be represented by a Radio Access Network. The Radio Access Network may comprise any, some or a plurality of e.g. a Radio Access Network Subsystem, an eNodeB, a nodeB, a radio network subsystem, a Radio Network Controller, a base station subsystem, a Home eNodeB, a Home NodeB, a Home eNodeB Gateway and/or a Home NodeB Gateway. Thus the Radio Access Network as referred to herein may comprise only one node 150, according to some embodiments.

The step of obtaining information from the target network control node 150, may optionally, according to some embodiments comprise sending a request for handover, comprising of a subscriber group identification, associated with the target subscriber group cell 152 from the network control node 120, 130 to the target network control node 150. In addition, the step of obtaining information from the target network control node 150 may comprise receiving a response to the sent request for handover from the target network control node 150, which response comprises information verifying that the subscriber group identification corresponds to the subscriber group identity of the target subscriber group cell 152.

However, according to some optional embodiments, the received response to the sent request for handover, which may be received from the target network control node 150, may comprise the subscriber group identity of the target subscriber group cell 152. Thus, according to those embodiments, the network control node 120, 130 may perform the further substep of comparing the received subscriber group identity of the target subscriber group cell 152 with the obtained subscriber group identification.

Step 607

The mobile node 110 is granted access to the target subscriber group cell 152.

Figure 7:
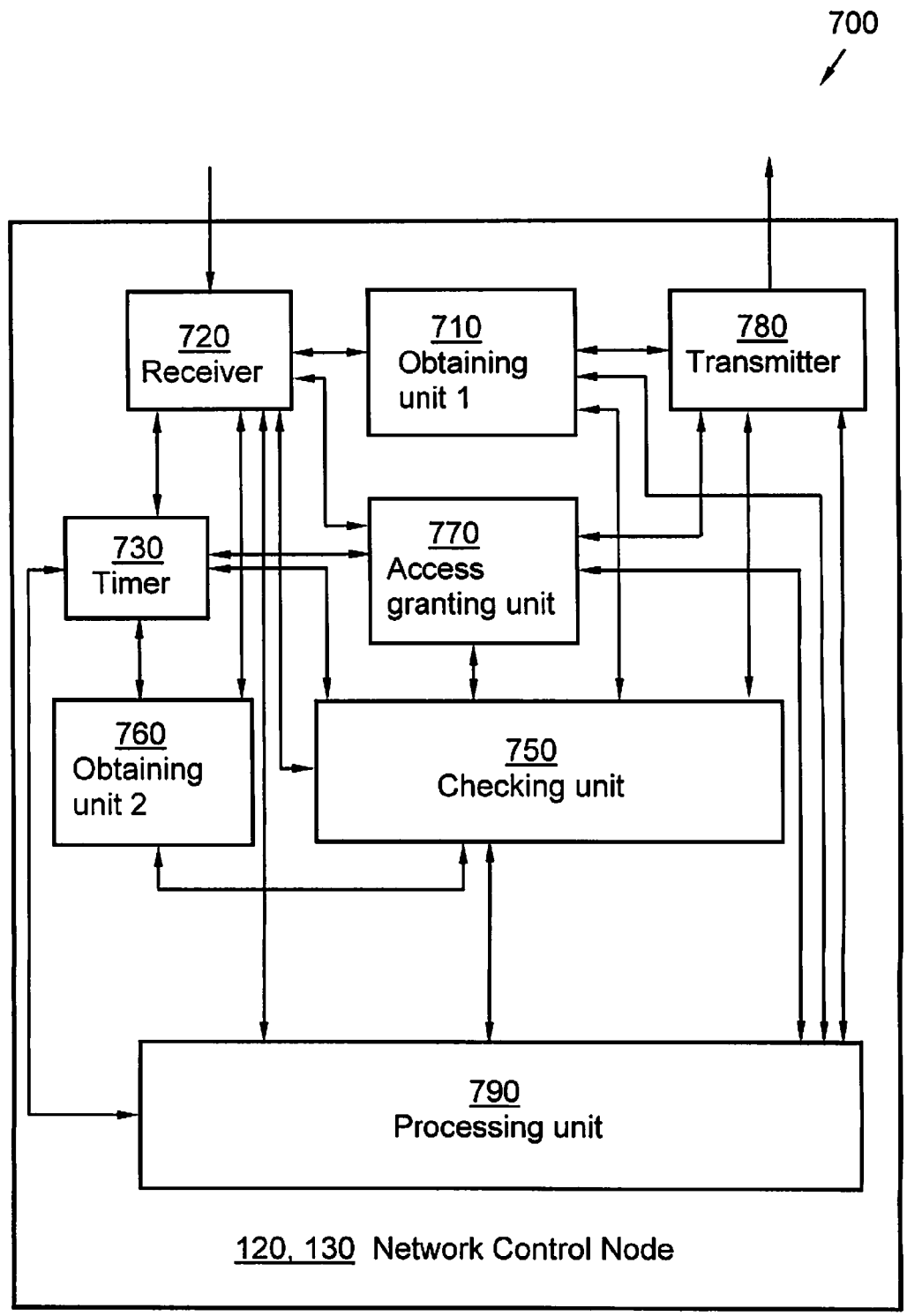
FIG. 7 is a block diagram illustrating embodiments of an arrangement in a network control node.

FIG. 7 is a block diagram illustrating embodiments of an arrangement 700 situated in a in a network control node 120, 130. The arrangement 700 is configured to perform at least some of the method steps 601-607 for performing access control for a mobile node 110 in a handover from a source cell 121 to a target subscriber group cell 152.

The network control node 120, 130, the source cell 121 and the target subscriber group cell 152 are comprised in a communication network 100.

The network control node 120, 130 may be a core network control node 130, represented by an entity comprised in the group: Mobility Management Entity (MME), Serving General Packet Radio Service Support Node (SGSN), Mobile Switching Centre (MSC), according to some embodiments.

However, according to some embodiments, the network control node 120, 130 may be a source network control node 120, represented by a Radio Access Network. The Radio Access Network may comprise any, some or a plurality of e.g. a Radio Access Network Subsystem, an eNodeB, a nodeB, a radio network subsystem, a Radio Network Controller, a base station subsystem, a Home eNodeB, a Home NodeB, a Home eNodeB Gateway and/or a Home NodeB Gateway. Thus the Radio Access Network as referred to herein may comprise only one node 120, according to some embodiments.

Further, according to some optional embodiments, the network control node 120, 130 may comprise, or be connected to, a time measurement unit 730.

The target subscriber group cell 152 may according to some embodiments be a Closed Subscriber Group cell (CSG cell). Further, the received target subscriber group identification may optionally be a Closed Subscriber Group ID (CSG ID).

The source cell 121 may according to some embodiments be a subscriber group cell such as e.g. a Closed Subscriber Group cell (CSG cell). However, according to some embodiments, the source cell 121 may be a cell with non restricted access.

The arrangement 700 comprises a first obtaining unit 710. The first obtaining unit 710 is adapted to obtain a network based allowed subscriber group list associated with the mobile node 110.

Further, the arrangement 700 comprises a receiving unit 720, adapted to receive a target subscriber group identification.

In addition, the arrangement 700 comprises a checking unit 750. The checking unit 750 is adapted to check if the target subscriber group identification is comprised in the obtained network based allowed subscriber group list.

Also, further yet, the arrangement 700 comprises a second obtaining unit 760. The second obtaining unit 760 adapted to obtain information from a target network control node 150, which target network control node 150 is associated with the target subscriber group cell 152.

The arrangement 700 in further addition comprises an access granting unit 770. The access granting unit 770 is adapted to grant the mobile node 110 access to the target subscriber group cell 152.

For the sake of clarity, any internal electronics of the arrangement 700, not completely necessary for performing the present method has been omitted from FIG. 7.

The arrangement 700 may according to some optional embodiments comprise, or be connected to, a time measurement unit 730. The time measurement unit 730 may be adapted to measure time.

The arrangement 700 may optionally comprise a checking unit 750. The checking unit 750 may be adapted to check if a time limit value associated with the mobile node 110 is exceeded, by performing a comparison with a time measurement value obtained from the time measurement unit 730.

The arrangement 700 may as a further additional option comprise a rejecting unit. The rejecting unit may be adapted to reject the mobile node 110 access to the target subscriber group cell 152.

The arrangement 700 may according to some embodiments comprise a processing unit 790. The processing unit 790 may be represented by e.g. a Central Processing Unit (CPU), a processor, a microprocessor, or other processing logic that may interpret and execute instructions. The processing unit 790 may perform all data processing functions for inputting, outputting, and processing of data including data buffering and device control functions, such as call processing control, user interface control, or the like.

Also, the arrangement 700 optionally may comprise a transmitting unit 780.

It is to be noted that the described units 710-790 comprised within the arrangement 700 may be regarded as separate logical entities, but not with necessity as separate physical entities. Any, some or all of the units 710-790 may be comprised or co-arranged within the same physical unit. However, in order to facilitate the understanding of the functionality of the arrangement 700, the comprised units 710-790 are illustrated as separate physical units in FIG. 7. Thus e.g. the transmitting unit 780 and the receiving unit 720 may, according to some embodiments, be comprised within one physical unit, a transceiver, which may comprise a transmitter circuit and a receiver circuit.

Computer Program Product in a Network Control Node 120, 130

The method steps 601-607 in the network control node 120, 130 may be implemented through one or more processing units 790 in the network control node 120, 130, together with computer program code for performing the functions of at least some of the present steps 601-607. Thus a computer program product, comprising instructions for performing the method steps 601-607 in the network control node 120, 130 may perform access control for a mobile node 110 in a handover from a source cell 121 to a target subscriber group cell 152.

The computer program product mentioned above may be provided for instance in the form of a data carrier carrying computer program code for performing the method steps 601-607 according to the present solution when being loaded into the processing unit 790. The data carrier may be e.g. a hard disk, a CD ROM disc, a memory stick, an optical storage device, a magnetic storage device or any other appropriate medium such as a disc or tape that can hold machine readable data. The computer program product may furthermore be provided as computer program code on a server and downloaded to the network control node 120, 130 remotely, e.g. over an Internet or an intranet connection.

The computer program product may comprise instructions for obtaining a network based allowed subscriber group list, associated with the mobile node 110. Further, the computer program product may comprise instructions for receiving a target subscriber group identification. In addition, the computer program product may comprise instructions for checking if the target subscriber group identification is comprised in the obtained network based allowed subscriber group list. The computer program product may further comprise instructions for obtaining information from a target network control node 150, which target network control node 150 is associated with the target subscriber group cell 152, wherein the information is verifying that the received subscriber group identification corresponds to the target subscriber group cell 152. Also, the computer program product may comprise instructions for granting the mobile node 110 access to the target subscriber group cell 152, when the computer program product is run on a processing unit 790 comprised within the network control node 120, 130.

Figure 8:
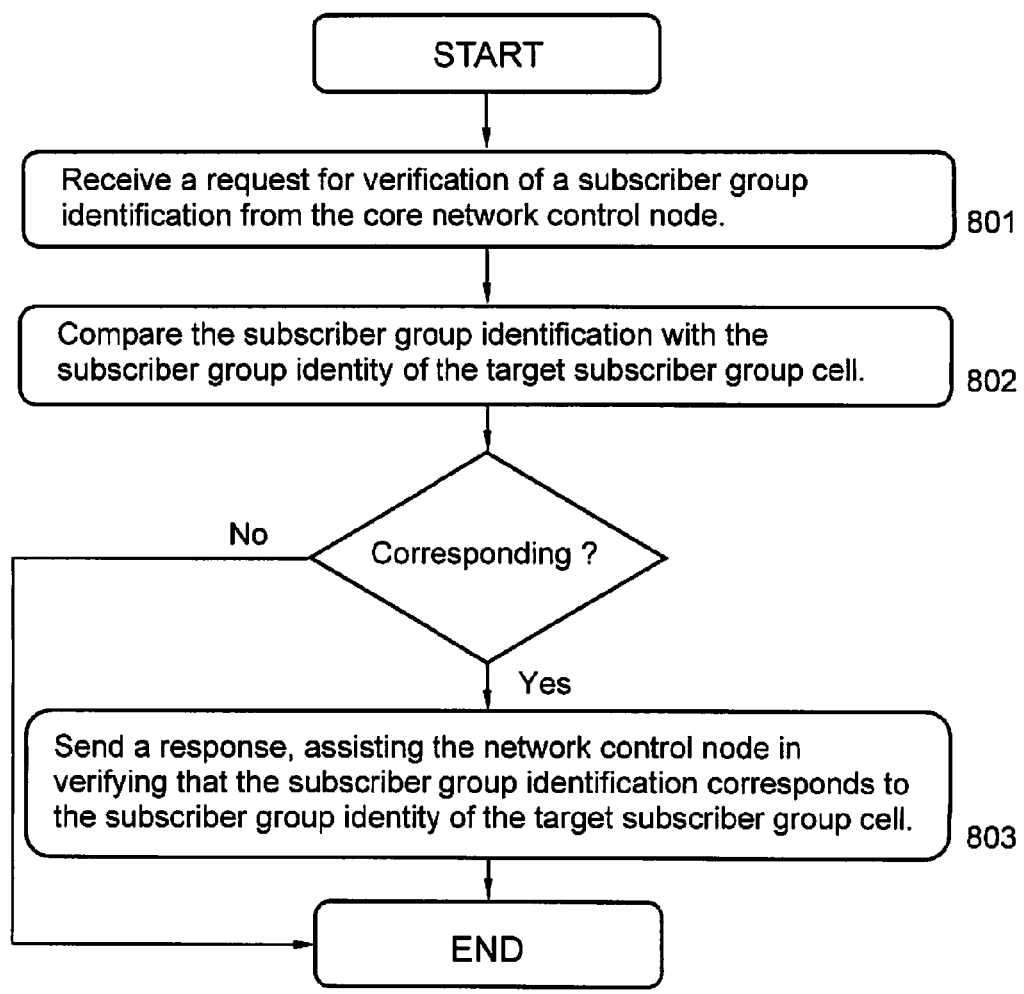
FIG. 8 is a flow chart illustrating embodiments of a method in a target network control node.

FIG. 8 is a flow chart illustrating embodiments of method steps 801-803 performed in a target network control node 150. The method aims at assisting a network control node 120, 130 in performing access control for a mobile node 110 in a handover from a source cell 121 to a target subscriber group cell 152.

The target subscriber group cell 152 is associated with the target control node 150. The network control node 120, 130, the target network control node 150 and the target subscriber group cell 152 are comprised in a communication network 100.

The target network control node 150 may be represented by a Radio Access Network. The Radio Access Network may comprise any, some or a plurality of e.g. a Radio Access Network Subsystem, an eNodeB, a nodeB, a radio network subsystem, a Radio Network Controller, a base station subsystem, a Home eNodeB, a Home NodeB, a Home eNodeB Gateway and/or a Home NodeB Gateway. Thus the Radio Access Network as referred to herein may comprise only one node 150, according to some embodiments.

The network control node 120, 130 may be a core network control node 130, represented by an entity comprised in the group: Mobility Management Entity (MME), Serving General Packet Radio Service Support Node (SGSN), Mobile Switching Centre (MSC), according to some embodiments.

However, according to some embodiments, the network control node 120, 130 may be a source network control node 120, represented by a Radio Access Network. The Radio Access Network may comprise any, some or a plurality of e.g. a Radio Access Network Subsystem, an eNodeB, a nodeB, a radio network subsystem, a Radio Network Controller, a base station subsystem, a Home eNodeB, a Home NodeB, a Home eNodeB Gateway and/or a Home NodeB Gateway. Thus the Radio Access Network as referred to herein may comprise only one node 120, according to some embodiments.

The target subscriber group cell 152 may according to some embodiments be a Closed Subscriber Group cell (CSG cell). Further, the received target subscriber group identification may optionally be a Closed Subscriber Group ID (CSG ID).

To appropriately assist a network control node 120, 130 in performing access control for a mobile node 110 in a handover from a source cell 121 to a target subscriber group cell 152, the method may comprise a number of method steps 801-803.

It is however to be noted that some of the described method steps 801-803, e.g. method step 802, is optional and only comprised within some embodiments. Further, it is to be noted that the method steps 801-803 may be performed in another chronological order than illustrated in this exemplary embodiment and that some method steps, e.g. step 801 and the optional step 802, or even all steps 801-803 may be performed simultaneously or in an altered or rearranged chronological order, according to different alternative embodiments. The method may comprise the following steps:

Step 801

A request for handover, comprising a subscriber group identification is received from the network control node 120, 130. The subscriber group identification is associated with the target subscriber group cell 152.

Step 802

This step is optional and may only be performed within some embodiments.

The received subscriber group identification may be compared with the subscriber group identity of the target subscriber group cell 152.

Step 803

A response to the received request for handover is sent to the network control node 120, 130. The response comprises information for assisting the network control node 120, 130 in verifying that the received subscriber group identification corresponds to the subscriber group identity of the target subscriber group cell 152.

According to some embodiments, such response may only be sent if the subscriber group identification corresponds to the subscriber group identity of the target subscriber group cell 152.

According to some embodiments, the response may comprise information verifying that the received subscriber group identification corresponds to the subscriber group identity of the target subscriber group cell 152.

However, according to some embodiments, the response sent 803 to the network control node 120, 130 may comprise the subscriber group identity of the target subscriber group cell 152.

If the verification failed, i.e. the identities do not match, a response may instead be sent indicating that the handover is rejected, according to some embodiments.

Figure 9:
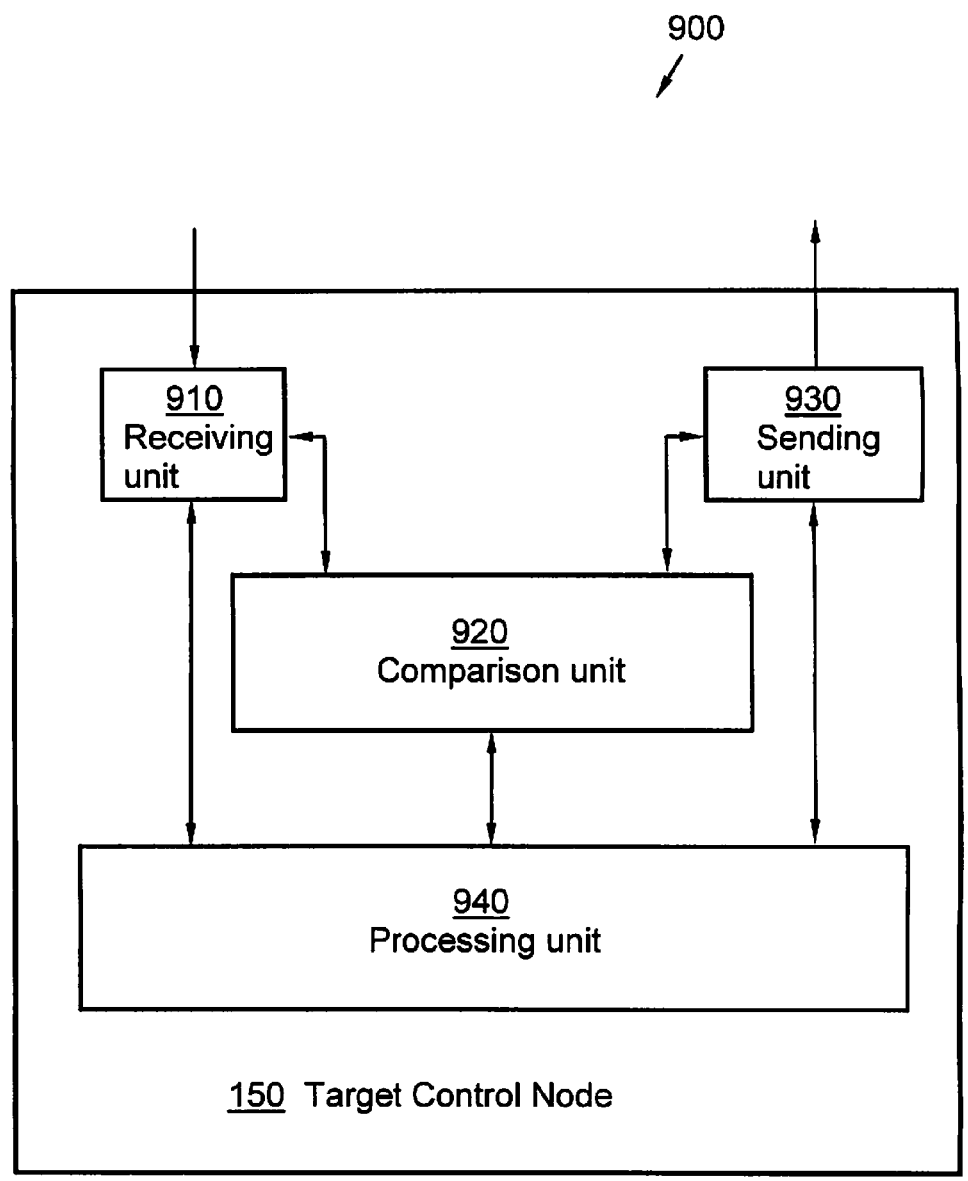
FIG. 9 is a block diagram illustrating embodiments of an arrangement in a target network control node.

FIG. 9 is a block diagram illustrating embodiments of an arrangement 900 situated in a in a target network control node 150. The arrangement 900 is configured to perform at least some of the method steps 801-803 in the target network control node 150, for assisting a network control node 120, 130 in performing access control for a mobile node 110 in a handover from a source cell 121 to a target subscriber group cell 152.

The target network control node 150, the network control node 120, 130, the source cell 121 and the target subscriber group cell 152 are comprised in a communication network 100.

The arrangement 900 comprises a receiving unit 910. The receiving unit 910 is adapted to receive a request for handover, comprising a subscriber group identification, associated with the target subscriber group cell 152, from the network control node 120, 130.

Additionally, the arrangement 900 comprises a sending unit 930. The sending unit 930 is adapted to send a response to the received request for handover to the network control node 120, 130. The response comprises information verifying that the received subscriber group identification corresponds to the subscriber group identity of the target subscriber group cell 152.

For the sake of clarity, any internal electronics of the arrangement 900 not completely necessary for performing the present method has been omitted from FIG. 9

Further, the arrangement 900 may comprise a comparison unit 920. The optional comparison unit 920 may be adapted to compare the received subscriber group identification with the subscriber group identity of the target subscriber group cell 152.

The arrangement 900 may according to some embodiments comprise a processing unit 940. The processing unit 940 may be represented by e.g. a Central Processing Unit (CPU), a processor, a microprocessor, or other processing logic that may interpret and execute instructions. The processing unit 940 may perform all data processing functions for inputting, outputting, and processing of data including data buffering and device control functions, such as call processing control, user interface control, or the like.

It is to be noted that the described units 910-940 comprised within the arrangement 900 may be regarded as separate logical entities, but not with necessity as separate physical entities. Any, some or all of the units 910-940 may be comprised or co-arranged within the same physical unit. However, in order to facilitate the understanding of the functionality of the arrangement 900, the comprised units 910-940 are illustrated as separate physical units in FIG. 9. Thus e.g. the sending unit 930 and the receiving unit 910 may, according to some embodiments, be comprised within one physical unit, a transceiver, which may comprise a transmitter circuit and a receiver circuit.

Computer Program Product in a Target Network Control Node 150

The method steps 801-803 in the target network control node 150 may be implemented through one or more processing units 940 in the target network control node 150, together with computer program code for performing the functions of at least some of the present steps 801-803. Thus a computer program product, comprising instructions for performing the method steps 801-803 in the target network control node 150 may assist a network control node 120, 130 in performing access control for a mobile node 110 in a handover from a source cell 121 to a target subscriber group cell 152. The source cell 121 may be a subscriber group cell or a non subscriber group cell.

The computer program product mentioned above may be provided for instance in the form of a data carrier carrying computer program code for performing the method steps 801-803 according to the present solution when being loaded into the processing unit 940. The data carrier may be e.g. a hard disk, a CD ROM disc, a memory stick, an optical storage device, a magnetic storage device or any other appropriate medium such as a disc or tape that can hold machine readable data. The computer program product may furthermore be provided as computer program code on a server and downloaded to the target network control node 150 remotely, e.g. over an Internet or an intranet connection.

The computer program product may comprise instructions for receiving a request for handover, comprising a subscriber group identification, from the network control node 120, 130. The subscriber group identification is associated with the target subscriber group cell 152. Further, the computer program product may comprise instructions for comparing the received subscriber group identification with the subscriber group identity of the target subscriber group cell 152. The computer program product may further comprise instructions for sending a response to the received request for handover, to the network control node 120, 130, if the subscriber group identification corresponds to the subscriber group identity of the target subscriber group cell 152. The response may comprise information verifying that the received subscriber group identification corresponds to the subscriber group identity of the target subscriber group cell 152, when the computer program product is run on a processing unit 940 comprised within the target network control node 150.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a network control node for performing access control for a mobile node in a handover from a source cell to a target subscriber group cell, wherein the network control node, the source cell and the target subscriber group cell are comprised in a communication network, the method comprising:
   obtaining a network based allowed subscriber group list associated with the mobile node,
   receiving a target subscriber group identification,
   checking if the obtained network based allowed subscriber group list includes the target subscriber group identification,
   if the list includes the target subscriber group identification, obtaining information from a target network control node associated with the target subscriber group cell, verifying based on the information that the received target subscriber group identification corresponds to the target subscriber group cell, and upon verification granting the mobile node access to the target subscriber group cell.

2. The method according to claim 1, wherein the network control node is a core network control node and comprises one or more of a Mobility Management Entity (MME), a Serving General Packet Radio Service Support Node (SGSN), and a Mobile Switching Centre (MSC).

3. The method according to claim 1, wherein the network control node is a source network control node comprised in a Radio Access Network.

4. The method according to claim 1, wherein the target subscriber group cell is a Closed Subscriber Group (CSG)

cell and wherein the received target subscriber group identification is a CSG identification (ID).

5. The method according to claim 1, wherein the network based allowed subscriber group list associated with the mobile node is obtained from a database.

6. The method according to claim 1, wherein obtaining said information from the target network control node comprises:
   sending to the target network control node a request for handover that includes the received target subscriber group identification; and
   receiving a response to the sent request for handover from the target network control node, wherein the response comprises said information.

7. The method according to claim 6, wherein said information indicates whether or not the received target subscriber group identification matches a subscriber group identity of the target subscriber group cell, and wherein the method comprises granting the mobile node access to the target subscriber group cell if the information indicates that the received target subscriber group identification matches the subscriber group identity of the target subscriber group cell.

8. The method according to claim 6, wherein said information comprises a subscriber group identity of the target subscriber group cell, and wherein the method further comprises comparing the received subscriber group identity to the subscriber group identity and granting the mobile node access to the target subscriber group cell if the received subscriber group identity matches the subscriber group identity.

9. The method according to claim 1, further comprising rejecting the mobile node access to the target subscriber group cell if the list does not include the target subscriber group identification.

10. The method according to claim 1, wherein the target network control node is comprised in a Radio Access Network.

11. The method according to claim 1, further comprising:
    checking if a time limit value associated with the mobile node is exceeded by a time measurement value; and
    if the time limit value is exceeded, rejecting the mobile node access to the target subscriber group cell.

12. A network control node for performing access control for a mobile node in a handover from a source cell to a target subscriber group cell, wherein the network control node, the source cell and the target subscriber group cell are comprised in a communication network, the network control node comprising:
    a processor and a memory, said memory containing instructions executable by said processor whereby said network control node is configured to:
    obtain a network based allowed subscriber group list associated with the mobile node,
    receive a target subscriber group identification,
    check if the list includes the target subscriber group identification; and
    if the list includes the target subscriber group identification, obtain information from a target network control node associated with the target subscriber group cell, verify based on the information that the received target subscriber group identification corresponds to the target subscriber group cell, and upon verification grant the mobile node access to the target subscriber group cell.

13. A method in a target network control node for assisting a network control node to perform access control for a mobile node in a handover from a source cell to a target subscriber group cell, wherein the target subscriber group cell is associated with the target network control node, wherein the network control node, the target network control node and the target subscriber group cell are comprised in a communication network, the method comprising:
    receiving from the network control node a request for handover that comprises a subscriber group identification; and
    sending a response to the received request for handover to the network control node,
    wherein the response comprises information for assisting the network control node in verifying that the received subscriber group identification corresponds to a subscriber group identity of the target subscriber group cell.

14. The method according to claim 13, further comprising comparing the received subscriber group identification with the subscriber group identity of the target subscriber group cell, and wherein the response sent to the network control node comprises information verifying that the received subscriber group identification corresponds to the subscriber group identity of the target subscriber group cell.

15. The method according to claim 13, wherein the response sent to the network control node comprises the subscriber group identity of the target subscriber group cell.

16. A target network control node configured to assist a network control node in performing access control for a mobile node in a handover from a source cell to a target subscriber group cell, wherein the target subscriber group cell is associated with the target network control node, wherein the network control node, the target control node and the target subscriber group cell are comprised in a communication network, the target network control node comprising:
    a processor and a memory, said memory containing instructions executable by said processor whereby said target network control node is configured to:
    receive from the network control node a request for handover that comprises a subscriber group identification; and
    send a response to the received request for handover to the network control node, wherein the response comprises information for assisting the network control node in verifying that the received subscriber group identification corresponds to a subscriber group identity of the target subscriber group cell.

* * * * *